United States Patent
Hatakeyama et al.

(10) Patent No.: US 12,379,304 B2
(45) Date of Patent: Aug. 5, 2025

(54) PARTICLE ANALYZER, PARTICLE ANALYSIS METHOD, AND OPTICAL MEASUREMENT DEVICE

(71) Applicant: Sony Group Corporation, Tokyo (JP)

(72) Inventors: Takeshi Hatakeyama, Chiba (JP); Satoshi Nagae, Tokyo (JP); Masanobu Nonaka, Kanagawa (JP); Kenji Ishida, Tokyo (JP); Naomichi Kikuchi, Kanagawa (JP); Takashi Kato, Tokyo (JP)

(73) Assignee: Sony Group Corporation, Tokyo (JP)

( * ) Notice: Subject to any disclaimer, the term of this patent is extended or adjusted under 35 U.S.C. 154(b) by 130 days.

(21) Appl. No.: 18/271,408

(22) PCT Filed: Dec. 9, 2021

(86) PCT No.: PCT/JP2021/045300
§ 371 (c)(1),
(2) Date: Jul. 7, 2023

(87) PCT Pub. No.: WO2022/153736
PCT Pub. Date: Jul. 21, 2022

(65) Prior Publication Data
US 2024/0068925 A1 Feb. 29, 2024

(30) Foreign Application Priority Data
Jan. 14, 2021 (JP) .................. 2021-004282

(51) Int. Cl.
*G01N 15/14* (2024.01)
*G01N 15/02* (2024.01)
(Continued)

(52) U.S. Cl.
CPC ..... *G01N 15/1434* (2013.01); *G01N 15/0227* (2013.01); *G01N 15/1459* (2013.01);
(Continued)

(58) Field of Classification Search
CPC ........... G01N 15/0227; G01N 15/1434; G01N 15/1459; G01N 15/149; G01N 21/05;
(Continued)

(56) References Cited

U.S. PATENT DOCUMENTS

| 7,715,006 B2 * | 5/2010 | Tabata ................... G01N 21/53 356/336 |
| 2003/0011902 A1 * | 1/2003 | Nishimura ............. G02B 7/025 359/819 |
| 2004/0070846 A1 | 4/2004 | Dobschal et al. |

FOREIGN PATENT DOCUMENTS

| JP | 2003-090945 A | 3/2003 |
| JP | 2004-219608 A | 8/2004 |

(Continued)

OTHER PUBLICATIONS

International Search Report and English translation thereof mailed Mar. 8, 2022 in connection with International Application No. PCT/JP2021/045300.

*Primary Examiner* — Mark R Gaworecki
(74) *Attorney, Agent, or Firm* — Wolf, Greenfield & Sacks, P.C.

(57) ABSTRACT

A particle analyzer (100) includes: a light source that emits excitation light (EL1) including light having a wavelength of 400 nm or less; a lens structure (41) that collects excitation light (EL1) at a predetermined position (51s) in a flow path (53); a detection unit (7) that detects light (FL) emitted from a particle as the particle (51) flowing through the predetermined position is excited by the excitation light (EL1); and a processing unit (120) that processes detection data acquired by the detection unit (7). The lens structure (41) includes a plurality of lenses (411) arranged along an optical axis of the excitation light (EL1); and a lens frame (412) holding the plurality of lenses (411). At least one (G12) of (Continued)

the plurality of lenses (411) is positioned in the lens frame (412) by abutting on a lens adjacent to the lens.

15 Claims, 19 Drawing Sheets

(51) Int. Cl.
    *G01N 15/0227*     (2024.01)
    *G01N 15/1434*     (2024.01)
    *G01N 21/05*     (2006.01)
    *G01N 21/64*     (2006.01)
    *G02B 21/00*     (2006.01)
    *G02B 21/02*     (2006.01)
    *G01N 15/10*     (2006.01)
    *G01N 15/149*     (2024.01)

(52) U.S. Cl.
    CPC ............ *G01N 21/05* (2013.01); *G01N 21/64* (2013.01); *G02B 21/00* (2013.01); *G02B 21/02* (2013.01); *G01N 2015/1006* (2013.01); *G01N 2015/144* (2013.01); *G01N 15/149* (2024.01); *G01N 2015/1493* (2013.01)

(58) Field of Classification Search
    CPC ........... G01N 21/64; G01N 2015/1006; G01N 2015/144; G01N 2015/1493; G02B 21/00; G02B 21/02
    See application file for complete search history.

(56) References Cited

FOREIGN PATENT DOCUMENTS

| | | |
|---|---|---|
| JP | 4252447 B2 | 4/2009 |
| JP | 2009-145213 A | 7/2009 |
| JP | 2012-127922 A | 7/2012 |
| JP | 2015-038539 A | 2/2015 |
| WO | WO 2014/064993 A1 | 5/2014 |
| WO | WO 2016/185623 A1 | 11/2016 |

* cited by examiner

FIG.5

| LENS STRUCTURE 41 | | POWER | nd | νd | PgF | FOCAL LENGTH | | |
|---|---|---|---|---|---|---|---|---|
| LENS G11 | | CONCAVE | 1.4875 | 70.2 | 0.5300 | ft=5.00 | f1=-54.60 | ft/f1=-0.092 |
| LENS G12 | CEMENTED DIVISION GROUP | CONVEX | 1.4388 | 95.0 | 0.5340 | | | |
| LENS G13 | | CONCAVE | 1.5891 | 61.2 | 0.5407 | | | |
| LENS G14 | | CONVEX | 1.4388 | 95.0 | 0.5340 | | f2=8.86 | ft/f2=0.565 |
| LENS G15 | CEMENTED DIVISION GROUP | CONVEX | 1.4388 | 95.0 | 0.5340 | | | |
| LENS G16 | | CONCAVE | 1.7380 | 32.3 | 0.5900 | | | |
| LENS G17 | | CONVEX | 1.4388 | 95.0 | 0.5340 | | | |
| LENS G18 | | CONVEX | 1.8040 | 46.5 | 0.5577 | | | |

FIG.8

| LENS STRUCTURE 42 | | POWER | nd | νd | PgF | FOCAL LENGTH | | | |
|---|---|---|---|---|---|---|---|---|---|
| LENS G21 | CEMENTED DIVISION GROUP | CONCAVE | 1.4970 | 81.6 | 0.5375 | ft=5.00 | f1=-46.08 | ft/f1=-0.109 |
| LENS G22 | | CONVEX | 1.6730 | 38.3 | 0.5757 | | | |
| LENS G23 | | CONVEX | 1.4388 | 95.0 | 0.5340 | | | |
| LENS G24 | | CONVEX | 1.4388 | 95.0 | 0.5340 | | f2=8.18 | ft/f2=0.611 |
| LENS G25 | CEMENTED DIVISION GROUP | CONVEX | 1.4388 | 95.0 | 0.5340 | | | |
| LENS G26 | | CONCAVE | 1.7380 | 32.3 | 0.5900 | | | |
| LENS G27 | | CONVEX | 1.4388 | 95.0 | 0.5340 | | | |
| LENS G28 | | CONVEX | 1.8040 | 46.5 | 0.5577 | | | |

FIG.11

| LENS STRUCTURE 43 | | POWER | nd | νd | PgF | FOCAL LENGTH | |
|---|---|---|---|---|---|---|---|
| LENS G31 | CEMENTED DIVISION GROUP | CONCAVE | 1.7550 | 52.3 | 0.5474 | f1=-31.49 | ft/f1=-0.159 |
| LENS G32 | | CONVEX | 1.4388 | 95.0 | 0.5340 | | |
| LENS G33 | CEMENTED DIVISION GROUP | CONVEX | 1.4388 | 95.0 | 0.5340 | ft=5.00 | |
| LENS G34 | | CONCAVE | 1.7550 | 52.3 | 0.5474 | | |
| LENS G35 | | CONVEX | 1.4388 | 95.0 | 0.5340 | f2=10.34 | ft/f2=0.483 |
| LENS G36 | CEMENTED DIVISION GROUP | CONVEX | 1.4388 | 95.0 | 0.5340 | | |
| LENS G37 | | CONCAVE | 1.7380 | 32.3 | 0.5900 | | |
| LENS G38 | | CONVEX | 1.7550 | 52.3 | 0.5474 | | |

FIG.14

| LENS STRUCTURE 44 | | POWER | nd | νd | PgF | FOCAL LENGTH | |
|---|---|---|---|---|---|---|---|
| LENS G41 | CEMENTED DIVISION GROUP | CONCAVE | 1.7550 | 52.3 | 0.5474 | f1=1346.90 | ft/f1=0.004 |
| LENS G42 | | CONVEX | 1.4388 | 95.0 | 0.5340 | | |
| LENS G43 | CEMENTED DIVISION GROUP | CONVEX | 1.4388 | 95.0 | 0.5340 | ft=5.00 | |
| LENS G44 | | CONCAVE | 1.7550 | 52.3 | 0.5474 | | |
| LENS G45 | CEMENTED DIVISION GROUP | CONVEX | 1.4388 | 95.0 | 0.5340 | f2=10.22 | ft/f2=0.489 |
| LENS G46 | | CONCAVE | 1.7550 | 52.3 | 0.5474 | | |
| LENS G47 | CEMENTED DIVISION GROUP | CONVEX | 1.4388 | 95.0 | 0.5340 | | |
| LENS G48 | | CONCAVE | 1.7380 | 32.3 | 0.5900 | | |
| LENS G49 | | CONVEX | 1.7550 | 52.3 | 0.5474 | | |

FIG.17

| LENS STRUCTURE 45 | | POWER | nd | νd | PgF |
|---|---|---|---|---|---|
| LENS G51 | | CONCAVE | 1.5952 | 67.7 | 0.5442 |
| LENS G52 | | CONVEX | 1.6074 | 56.8 | 0.5483 |
| LENS G53 | CEMENTED DIVISION GROUP | CONVEX | 1.4388 | 95.0 | 0.5340 |
| LENS G54 | | CONCAVE | 1.7550 | 52.3 | 0.5474 |
| LENS G55 | | CONVEX | 1.4388 | 95.0 | 0.5340 |
| LENS G56 | CEMENTED DIVISION GROUP | CONVEX | 1.4388 | 95.0 | 0.5340 |
| LENS G57 | | CONCAVE | 1.7380 | 32.3 | 0.5900 |
| LENS G58 | | CONVEX | 1.7550 | 52.3 | 0.5474 |

PARTICLE ANALYZER, PARTICLE ANALYSIS METHOD, AND OPTICAL MEASUREMENT DEVICE

CROSS REFERENCE TO RELATED APPLICATIONS

This is a U.S. National Stage Application under 35 U.S.C. § 371, based on International Application No. PCT/JP2021/045300, filed Dec. 9, 2021, which claims priority to Japanese Patent Application JP 2021-004282, filed Jan. 14, 2021, each of which is hereby incorporated by reference in its entirety.

FIELD

The present disclosure relates to a particle analyzer, a particle analysis method, and an optical measurement device.

BACKGROUND

Conventionally, an optical measurement method using flow cytometry has been used for analysis of biologically relevant particles such as cells, microorganisms, and liposomes. A flow cytometer is a device configured to perform optical measurement using the flow cytometry, in which particles flowing in a flow path formed in a flow cell, a microchip, or the like are irradiated with light, and fluorescence or scattered light emitted from each of the particles is detected to execute analysis or the like.

Some flow cytometers have a function of fractionating and recovering only particles having a specific characteristic on the basis of an analysis result, and particularly, a device for sorting cells is called a "cell sorter". As a sorting method of the cell sorter, a droplet charging method of charging and separating droplets containing particles is mainly adopted (see, for example, Patent Literature 1). In a device adopting the droplet charging method, a fluid discharged from a flow cell, a microchip, or the like is converted into droplets, a positive (+) charge or a negative (−) charge is applied to the droplets, and the droplets are recovered in a predetermined container by changing a traveling direction by a deflection plate or the like.

CITATION LIST

Patent Literature

Patent Literature 1: JP 2009-145213 A
Patent Literature 2: JP 2012-127922 A

SUMMARY

Technical Problem

In an optical measurement device configured for fluorescence observation, such as the flow cytometer, it is necessary to excite particles by irradiating the particles with laser light having a strong intensity, and thus, an objective lens for collecting the laser light is required. An objective lens used in general optical measurement devices configured for fluorescence observation and the like is a lens structure formed by combining a plurality of lenses, and an adhesive is used for assembly thereof. Therefore, there is a problem that optical characteristics of the objective lens may be deteriorated due to burning of the adhesive by the laser light having the strong intensity, burning of outgas emitted from the adhesive and attached to the lens surface by the excitation light, and the like.

In recent years, lasers in an ultraviolet region at a wavelength shorter than 405 nm have also been used as a result of development of reagents in flow cytometers. In general, the burning of the adhesive described above is more likely to occur as the wavelength is shorter, and thus, the above problem becomes more serious.

In addition, when an ultraviolet laser is used, fluorescence to be generated ranges from the ultraviolet region to a near-infrared region, and thus, it is necessary to correct chromatic aberration of the objective lens in a wide band.

In addition, an optical glass itself used for the objective lens often has poor transmittance characteristics in the ultraviolet region. In order to correct the chromatic aberration in the wide band, it is necessary to design using a plurality of types of optical glass, but there is a problem that it is difficult to ensure sufficient transmittance characteristics due to absorption of the glass itself.

Therefore, the present disclosure proposes a particle analyzer, a particle analysis method, and an optical measurement device capable of suppressing deterioration of optical characteristics.

Solution to Problem

To address the above mentioned technical problem, a particle analyzer according to one embodiment of the present disclosure includes: a light source that emits excitation light including light having a wavelength of 400 nm or less; a lens structure that collects the excitation light at a predetermined position in a flow path; a detection unit that detects light emitted from a particle as the particle flowing through the predetermined position is excited by the excitation light; and a processing unit that processes detection data acquired by the detection unit, wherein the lens structure includes: a plurality of lenses arranged along an optical axis of the excitation light; and a lens frame holding the plurality of lenses, and at least one of the plurality of lenses is positioned in the lens frame by abutting on a lens adjacent to the at least one lens.

A particle analysis method according to one embodiment of the present disclosure includes: collecting excitation light including light having a wavelength of 400 nm or less at a predetermined position in a flow path using a lens structure; detecting light emitted from a particle as the particle flowing through the predetermined position is excited by the excitation light; and processing detection data, wherein the lens structure includes: a plurality of lenses arranged along an optical axis of the excitation light; and a lens frame holding the plurality of lenses, and at least one of the plurality of lenses is positioned in the lens frame by abutting on a lens adjacent to the at least one lens.

An optical measurement device according to one embodiment of the present disclosure includes: a light source that emits excitation light including light having a wavelength of 400 nm or less; a lens structure that collects the excitation light at a predetermined position in a flow path; and a detection unit that detects light emitted from a particle as the particle flowing through the predetermined position is excited by the excitation light, wherein the lens structure comprises: a plurality of lenses arranged along an optical axis of the excitation light; and a lens frame holding the plurality of lenses, and at least one of the plurality of lenses is positioned in the lens frame by abutting on a lens adjacent to the at least one lens.

BRIEF DESCRIPTION OF DRAWINGS

FIG. 5 is a view illustrating an example of lens design in the first embodiment and Example 1.

FIG. 8 is a view illustrating an example of lens design in the first embodiment and Example 2.

FIG. 11 is a view illustrating an example of lens design in the first embodiment and Example 3.

FIG. 14 is a view illustrating an example of lens design in the first embodiment and Example 4.

FIG. 17 is a view illustrating an example of lens design in the second embodiment and Example 5.

DESCRIPTION OF EMBODIMENTS

Hereinafter, an embodiment of the present disclosure will be described in detail with reference to the drawings. Note that the same elements are denoted by the same reference signs in the following embodiment, and a repetitive description thereof will be omitted.

In addition, the present disclosure will be described in the following item order.

1. Embodiments
  1.1. Example of First Design Condition of Lens Structure
  1.2. Example of Second Design Condition of Lens Structure
  1.3. Example of Third Design Condition of Lens Structure
  1.4. Example of Fourth Design Condition of Lens Structure
  1.5. Example of Fifth Design Condition of Lens Structure
  1.6. Example of Sixth Design Condition of Lens Structure
  1.7. Lens Structure in First Embodiment and Example 1
  1.8. Lens Structure in First Embodiment and Example 2
  1.9. Lens Structure in First Embodiment and Example 3
  1.10. Lens Structure in First Embodiment and Example 4
  1.11. Lens Structure in Second Embodiment and Example 5
  1.12. Example of Another Lens Structure in Second Embodiment
2. Modifications
3. Example of Effect 1. Embodiments An optical measurement device exemplified in an embodiment is an open cell sorter. However, the disclosed technology is also applicable to a closed cell sorter. In the embodiment, a microchip method will be described as an example of a method of supplying particles (microparticles) to an observation point (hereinafter, also referred to as "spot") on a flow path. In addition to the microchip method, however, various methods such as a droplet method, a cuvette method, and a flow cell method may be adopted. In addition to the cell sorter, the disclosed technology can be applied to various optical measurement devices measuring particles passing through a spot set on a flow path, for example, an analyzer-type flow cytometer, a microscope that acquires an image of the particles on the flow path, and the like.

Figure 1:
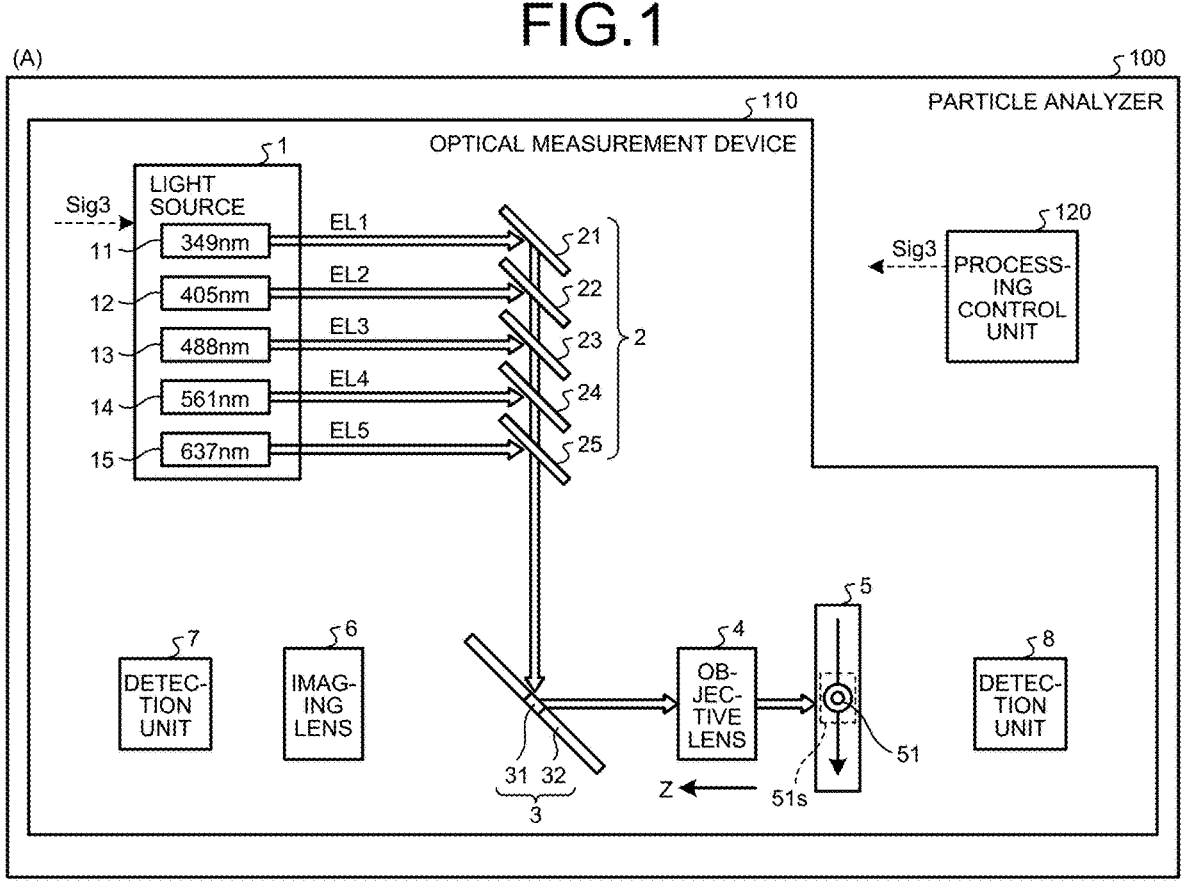
FIG. 1 is a diagram illustrating schematic configuration examples of an optical measurement device according to an embodiment and a particle analyzer including the optical measurement device.
Figure 1:
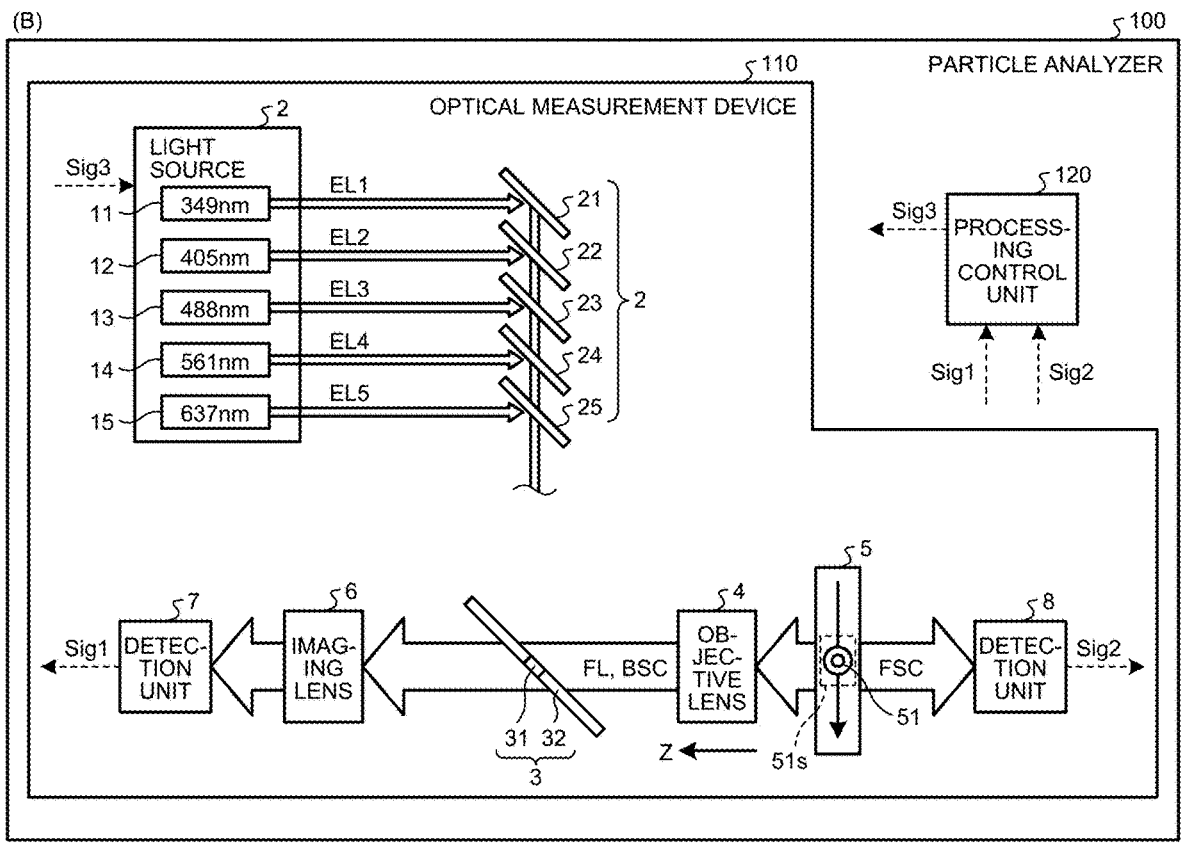

FIG. 1 is a diagram illustrating schematic configuration examples of the optical measurement device according to the embodiment and a particle analyzer including the optical measurement device. A particle analyzer 100 includes an optical measurement device 110 and a processing control unit 120. The particle analyzer 100 includes a light source 1, a mirror group 2, a mirror 3, an objective lens 4, a microchip 5, an imaging lens 6, a detection unit 7, and a detection unit 8. A Z-axis corresponding to a direction of the objective lens 4 is illustrated in the drawing. A positive Z-axis direction corresponds to a direction from the microchip 5 toward the mirror 3 (a traveling direction of scattered light BSC to be described later and the like). A negative Z-axis direction corresponds to a direction from the mirror 3 toward the microchip 5 (a traveling direction of excitation light EL1 and the like to be described later).

The optical measurement device 110 measures a subject located at a predetermined position in a flow path in the microchip 5. In this example, a particle 51 located at a spot 51s is measured as the subject. The optical measurement device 110 irradiates the particle 51 with excitation light and detects light emitted from the particle 51. Hereinafter, the excitation light irradiation will be described with reference to (A) of FIG. 1, and the light detection will be described with reference to (B) of FIG. 1.

Referring to (A) of FIG. 1, the light source 1 emits the excitation light that is light for exciting the particle 51. The excitation light may be coherent light such as a laser or a beam. The excitation light may be pulsed light. The light source 1 emits the excitation light including light at a wavelength in an ultraviolet region. The light in the ultraviolet region referred to herein may be light having a wavelength of 400 nm or less, more specifically, light having a wavelength of 350 nm or less. The light source 1 emits the excitation light in accordance with a signal Sig3 from a processing control unit 120 to be described later. As a result, the particle 51 is irradiated with the excitation light at the timing when the particle 51 is located at the spot 51s.

The light source 1 may emit a plurality of beams of excitation light. In this example, the light source 1 includes a light source 11 to a light source 15. The light source 11 emits excitation light having a wavelength of 349 nm. The light source 12 outputs excitation light having a wavelength of 405 nm. The light source 13 emits excitation light having a wavelength of 488 nm. The light source 14 emits excitation light having a wavelength of 561 nm. The light source 15 emits excitation light having a wavelength of 637 nm. An example of an output level of the excitation light is several mW to several tens of mW. Beams of the excitation light emitted from the light source 11 to the light source 15 is referred to and illustrated as the excitation light EL1 to excitation light EL5, respectively. Hereinafter, the excitation light EL1 to the excitation light EL5 may also be collectively referred to as the "excitation light EL1 and the like" in some cases.

The mirror group 2 guides the excitation light EL1 and the like from the light source 1 to a central portion 31 of the mirror 3, for example, with their optical axes aligned (combined). Specifically, the mirror group 2 includes mirrors 21 to 25 in this example. The mirror 21 reflects the excitation light EL1 from the light source 11 toward the central portion 31 of the mirror 3. The mirror 22 transmits the excitation light EL1 from the mirror 21, and reflects the excitation light EL2 from the light source 12 toward the central portion 31 of the mirror 3. The mirror 23 transmits the excitation light EL1 and the excitation light EL2 from the mirror 22, and reflects the excitation light EL3 from the light source 13 toward the central portion 31 of the mirror 3. The mirror 24 transmits the excitation light EL1 to the excitation light EL3 from the mirror 23, and reflects the excitation light EL4 from the light source 14 toward the central portion 31 of the mirror 3. The mirror 25 transmits the excitation light EL1 to the excitation light EL4 from the mirror 24, and reflects the excitation light EL5 from the light source 15 toward the central portion 31 of the mirror 3. The mirror 21 is, for example, a total reflection mirror. The mirrors 22 to 25 are, for example, dichroic mirrors.

The mirror 3 is an area division mirror in which an area is divided into a central portion 31 and a peripheral portion 32. The mirror 3 is an optical system that guides the excitation light EL1 and the like from the mirror group 2, which has been incident on the central portion 31, to the objective lens 4, and reflects the excitation light EL1 and the like toward the objective lens 4. The mirror 3 is disposed among the light source 1 (more specifically, the mirror group 2), the objective lens 4, and the detection unit 7 (more specifically, the imaging lens 6) such that, for example, the excitation light EL1 and the like from the mirror group 2 are incident at an incident angle of 45°.

The objective lens 4 collects the excitation light EL1 and the like from the mirror 3 on a spot 51s in the microchip 5.

Details of the objective lens 4 will be described later with reference to FIG. 3 and subsequent drawings.

The microchip 5 provides a subject which is an object to be measured by the optical measurement device 110. The microchip 5 will be described with reference to FIG. 2.

Figure 2:
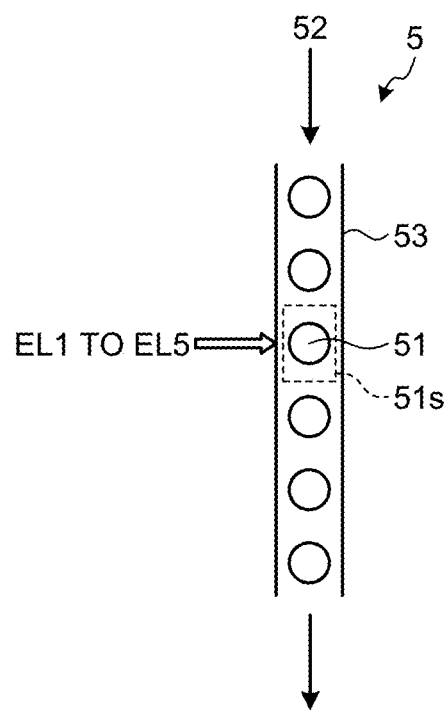
FIG. 2 is a view illustrating a schematic configuration example of a microchip.

FIG. 2 is a view illustrating a schematic configuration example of the microchip. The microchip 5 includes a flow path 53 through which the particle 51 flows. In this example, the particle 51 is a biological particle included in a biological sample 52. The flow path 53 is configured such that the biological sample 52, particularly the particles 51, flow in a manner aligned substantially in a row. The biological sample 52 and a flow path structure including the biological sample may be made of a material such as plastic or glass.

The biological sample 52 is, for example, cells or non-cellular biological particles. The cells may be living cells, and more specific examples thereof include blood cells such as red blood cells or white blood cells, and germ cells such as sperms or fertilized eggs. The cells may be directly collected from a specimen such as whole blood, or may be cultured cells obtained after culture. Examples of the non-cellular biological particles can include extracellular vesicles, particularly, exosomes and microvesicles. The biological particles may be labeled with one or a plurality of labeling substances (for example, dyes (particularly, fluorescent dyes) and fluorescent dye-labeled antibodies). Note that the optical measurement device may analyze particles other than the biological particles, and may analyze beads or the like for calibration or the like.

Returning to (A) of FIG. 1, the particle 51 is irradiated with the excitation light EL1 and the like collected by the objective lens 4, and the particle 51 is excited. Fluorescence is generated due to the excitation of the particle 51. In addition, scattered light is generated due to scattering of the excitation light EL1 and the like by the particle 51.

With reference to (B) of FIG. 1, fluorescence traveling toward the objective lens 4 (in the positive Z-axis direction) out of the fluorescence generated by the particle 51 is referred to and illustrated as fluorescence FL. Out of the scattered light generated by the particle 51, fluorescence traveling in the same direction as the excitation light EL1 is referred to as the scattered light BSC (backscattered light). Out of the scattered light generated by the particle 51, scattered light traveling toward the side opposite to the objective lens 4 (in the negative Z-axis direction) is referred to as scattered light FSC (forward scattered light).

The objective lens 4 guides at least a part of the fluorescence FL from the microchip 5 and the scattered light BSC to the peripheral portion 32 of the mirror 3 while collecting the both.

The mirror 3 allows the fluorescence FL and the scattered light BSC from the objective lens 4 incident on the peripheral portion 32 to be transmitted therethrough and guided to the imaging lens 6. As described above, the mirror 3 also has a function of reflecting the excitation light EL1 and the like from the mirror group 2 incident on the central portion 31 toward the objective lens 4. The central portion 31 of the mirror 3 reflects light in a wavelength band of the excitation light EL1 and the like and transmits light in the other wavelength band with respect to incidence at, for example, 45°. The central portion 31 is, for example, a portion on which a dichroic mirror coating is formed. The peripheral portion 32 of the mirror 3 forms, for example, a portion other than the central portion 31 of the mirror 3, and transmits the fluorescence FL and the scattered light BSC. The peripheral portion 32 is, for example, a portion on which an antireflection coating is formed.

The imaging lens 6 collects the fluorescence FL and the scattered light BSC transmitted through the mirror 3 on the detection unit 7. Since the objective lens 4 can have a function of collecting the fluorescence FL and the scattered light BSC as described above, the imaging lens 6 may collect the fluorescence FL and the scattered light BSC in cooperation with the objective lens 4.

The detection unit 7 detects the fluorescence FL and the scattered light BSC from the imaging lens 6. For example, the detection unit 7 detects, as a component of the fluorescence FL, light having a wavelength other than the wavelengths of the excitation light EL1 and the like in a wavelength band of 360 nm to 850 nm. The detection unit 7 detects, as a component of the scattered light BSC, light having the same wavelength as a wavelength of some excitation light (for example, the excitation light EL3 having the wavelength of 488 nm) of the excitation light EL1 and the like as the scattered light BSC.

The detection unit 7 detects, for example, the amount of light (spectrum) for each wavelength. The detection unit 7 may include a spectroscopic optical system that disperses the incident light for each wavelength, a detector (two-dimensional image sensor, photodiode, or the like) that detects the amount of light for each wavelength, and the like. A detection result acquired by the detection unit 7 is transmitted to the processing control unit 120 as detection data. A signal of the detection data transmitted from the detection unit 7 to the processing control unit 120 is referred to as a signal Sig1 in the drawing.

The detection unit 8 detects the scattered light FSC from the microchip 5. An example of the configuration of the detection unit 8 may be similar to the configuration related to the scattered light BSC of the detection unit 7. A detection result of the detection unit 8 is transmitted to the processing control unit 120 as detection data. A signal of the detection data transmitted from the detection unit 8 to the processing control unit 120 is referred to as a signal Sig2 in the drawing.

The processing control unit 120 has a function as a processing unit that processes the detection data (signal Sig1) from the detection unit 7. An example of the processing is analysis processing of the particle 51. For example, the processing control unit 120 analyzes a component, a size, and the like of the particle 51 by evaluating a spectrum of the fluorescence FL. A spectrum image, an evaluation result, and the like may be presented to a user. When the scattered light BSC is detected, it is desirable that light having a small scattering angle be shielded by a mask or the like, and light having a large scattering angle be transmitted and detected.

The processing control unit 120 also has a function as a control unit that controls the light source 1 on the basis of the detection data (signal Sig2) from the detection unit 8. Specifically, the processing control unit 120 identifies a timing at which the next particle 51 passes through the spot 51s of the microchip 5 on the basis of the detection data from the detection unit 8, and controls the light source 1 such that the next particle 51 is irradiated with the excitation light EL1 and the like at that timing. A signal (control signal) for controlling the light source 1 is generated as the signal Sig3 and transmitted from the processing control unit 120 to the light source 1. As described above, the light source 1 emits the excitation light EL and the like according to the signal Sig3.

In the particle analyzer 100 and the optical measurement device 110 described above, for example, high-intensity laser light for exciting the particle 51 passes through the objective lens 4. As will be described later, the objective lens 4 includes a plurality of lenses, but when an adhesive is used for assembly thereof, there is a possibility that the adhesive and even outgas emitted from the adhesive and attached to a lens surface are burnt by the laser light to deteriorate optical characteristics. In particular, the above-described problem becomes apparent as a wavelength of the excitation light is shortened, that is, as the excitation light having a wavelength in the ultraviolet region of 400 nm or less, such as the excitation light EL1 is used.

The fluorescence FL also passes through the objective lens 4. Since a wavelength range of the fluorescence FL is a wide range from the ultraviolet region to a near-infrared region, for example, chromatic aberration of the objective lens 4 also needs to be corrected to a wide band. Many optical glasses used for lenses have poor transmittance characteristics in the ultraviolet region. In order to correct the chromatic aberration in the wide band, design using a plurality of types of optical glass is required, but there is a problem that it is difficult to ensure sufficient transmittance characteristics due to absorption of the glass itself.

The objective lens 4 is a lens structure designed to cope with at least some of the problems described above. The lens structure includes a plurality of lenses arranged (disposed) along an optical axis of the excitation light EL1 and the like (in the Z-axis direction), and a lens frame holding the plurality of lenses. Several examples of design conditions of the lens structure will be described. The lens structure is designed to satisfy one or more design conditions.

1.1. Example of First Design Condition of Lens Structure

The lens frame may hold a plurality of lenses without using an adhesive in the lens frame. At least one of the plurality of lenses in the lens frame may be positioned by abutting on a lens adjacent to the lens. Adjacent lenses constitute a cemented division group. A plurality of the cemented division groups may be configured, and in this case, relative positions of cemented division surfaces are fixed without using an adhesive.

When a first design condition is satisfied, the inside of the lens frame has an adhesive-free structure, and thus, it is possible to prevent the burning of the adhesive, the burning of the outgas emitted from the adhesive and attached to the lens surface, and the like. For example, it is possible to suppress the deterioration of the optical characteristics of the lenses constituting the cemented division group. Since the cemented division group is formed, axial chromatic aberration can be satisfactorily corrected while suppressing an increase in size and cost of the optical system. This effect becomes more apparent as the number of the cemented division groups increases. The possibility of achieving cost reduction due to reduction in the number of components, simplification of an assembly process, and the like also increases.

1.2. Example of Second Design Condition of Lens Structure

The lens structure may have a positive lens closest to a subject side (negative Z-axis direction side). A glass material of the positive lens may satisfy the following (1) and (2).

$$1.73 < nd < 1.83 \tag{1}$$

$$(2) 45 < vd \tag{2}$$

A refractive index in the d-line is denoted by nd. An Abbe number in the d-line is denoted by vd.

When a second design condition is satisfied, a transmittance in the ultraviolet region can be ensured, and the chromatic aberration can be corrected in the wide band. For example, when nd is less than a lower limit of the above (1), a curvature of the positive lens becomes tight, performance is deteriorated, and manufacturing also becomes difficult. When nd exceeds an upper limit of the above (1), the glass transmittance with respect to an ultraviolet ray is deteriorated, and an intensity of laser light (the excitation light EL1 and the like) with which the particle 51 is irradiated decreases, and problems such as autofluorescence occur. When vd is less than a lower limit of the above (2), the glass transmittance with respect to the ultraviolet ray is deteriorated, the intensity of the laser light with which the particle 51 is irradiated is reduced, and the problems such as autofluorescence occur.

1.3. Example of Third Design Condition of Lens Structure

The lens structure may have at least three or more positive lenses. These positive lenses may be positive lenses different from the positive lens closest to the subject side (negative Z-axis direction side) in the above-described second design condition. A glass material of three or more positive lenses may satisfy the following (3) to (5).

$$nd<1.52 \qquad (3)$$

$$79<vd \qquad (4)$$

$$PgF<0.54 \qquad (5)$$

PgF is a partial dispersion ratio of the g-line and the F-line.

When a third design condition is satisfied as well, the transmittance in the ultraviolet region can be ensured, and the chromatic aberration can be corrected in the wide band. When nd exceeds an upper limit of the above (3), the glass transmittance with respect to the ultraviolet ray is deteriorated, the intensity of the laser light with which the particle 51 is irradiated is reduced, and the problems such as autofluorescence occur. When vd is less than a lower limit of (4), the chromatic aberration is deteriorated. When PgF exceeds an upper limit of (5), the chromatic aberration of ultraviolet ray is deteriorated.

1.4. Example of Fourth Design Condition of Lens Structure

The lens structure may have at least two or more negative lenses. Glass material of these negative lenses may satisfy the following (6) and (7).

$$nd<1.78 \qquad (6)$$

$$29<vd \qquad (7)$$

When a fourth design condition is satisfied as well, the transmittance in the ultraviolet region can be ensured, and the chromatic aberration can be corrected in the wide band. When nd exceeds an upper limit of the above (6), the glass transmittance with respect to the ultraviolet rays is deteriorated. When vd is less than a lower limit of (7), the glass transmittance with respect to the ultraviolet rays is deteriorated.

1.5. Example of Fifth Design Condition of Lens Structure

The plurality of lenses may include a retrofocus configuration (inverse telephoto configuration). The plurality of lenses may include a front lens group having negative refractive power or substantially no power and a rear lens group having positive refractive power, which are disposed in this order from an incident side to an emission side of the excitation light EL1 and the like (in the negative Z-axis direction). Having substantially no power may include having a negative refractive index or a positive refractive index to such an extent that diffusion and collection of light are not significantly affected, a design error, and the like. Outer shapes of lenses constituting the front lens group may be substantially larger in the negative Z-axis direction. The outer shapes being substantially larger may include an outer shape of a lens being the same as an outer shape of an adjacent lens. Outer shapes of lenses constituting the rear lens group may be substantially smaller in the negative Z-axis direction. The outer shapes being substantially smaller may include an outer shape of a lens being the same as an outer shape of an adjacent lens. The plurality of lenses may satisfy the following (8) and (9).

$$-0.24<ft/f1<0.08 \qquad (8)$$

$$0.35<ft/f2<0.7 \qquad (9)$$

A focal length of the entire plurality of lenses is denoted by ft. A focal length of the front lens group is denoted by f1. A focal length of the rear lens group is denoted by f2.

When a fifth design condition is satisfied, a focal length of the objective lens can be shortened as compared with, for example, a case where a telephoto configuration is provided. When ft/f1 is lower than a lower limit of the above (8), negative power becomes too strong, and the performance is deteriorated. When ft/f1 exceeds an upper limit of the above (8) or ft/f2 is lower than a lower limit of the above (9), it is difficult to shorten the focal length. When ft/f2 exceeds an upper limit of the above (9), positive power becomes too strong, and the performance is deteriorated.

1.6. Example of Sixth Design Condition of Lens Structure

The plurality of lenses may have a telephoto configuration. Outer shapes of the plurality of lenses become substantially smaller from the incident side to the emission side of the excitation light EL1 (in the negative Z-axis direction). There is a higher possibility that the number of lenses can be reduced and the cost can be reduced as compared with the retrofocus configuration (inverse telephoto configuration). In addition, for example, since the plurality of lenses can be fitted and held in the single lens frame, the cost of a mechanical component can be reduced accordingly.

The first to sixth design conditions described above are merely examples, and there may be various other design conditions appearing in embodiments and examples of the lens structure to be described later. Based on the above, some embodiments and examples of the lens structure will be described. The embodiments to be described are both a first embodiment and a second embodiment. These embodiments are particularly different in that the first embodiment has the retrofocus configuration (corresponding to the fifth design condition), whereas the second embodiment has the telephoto configuration (corresponding to the sixth design condition).

1.7. Lens Structure in First Embodiment and Example 1

Figure 3:
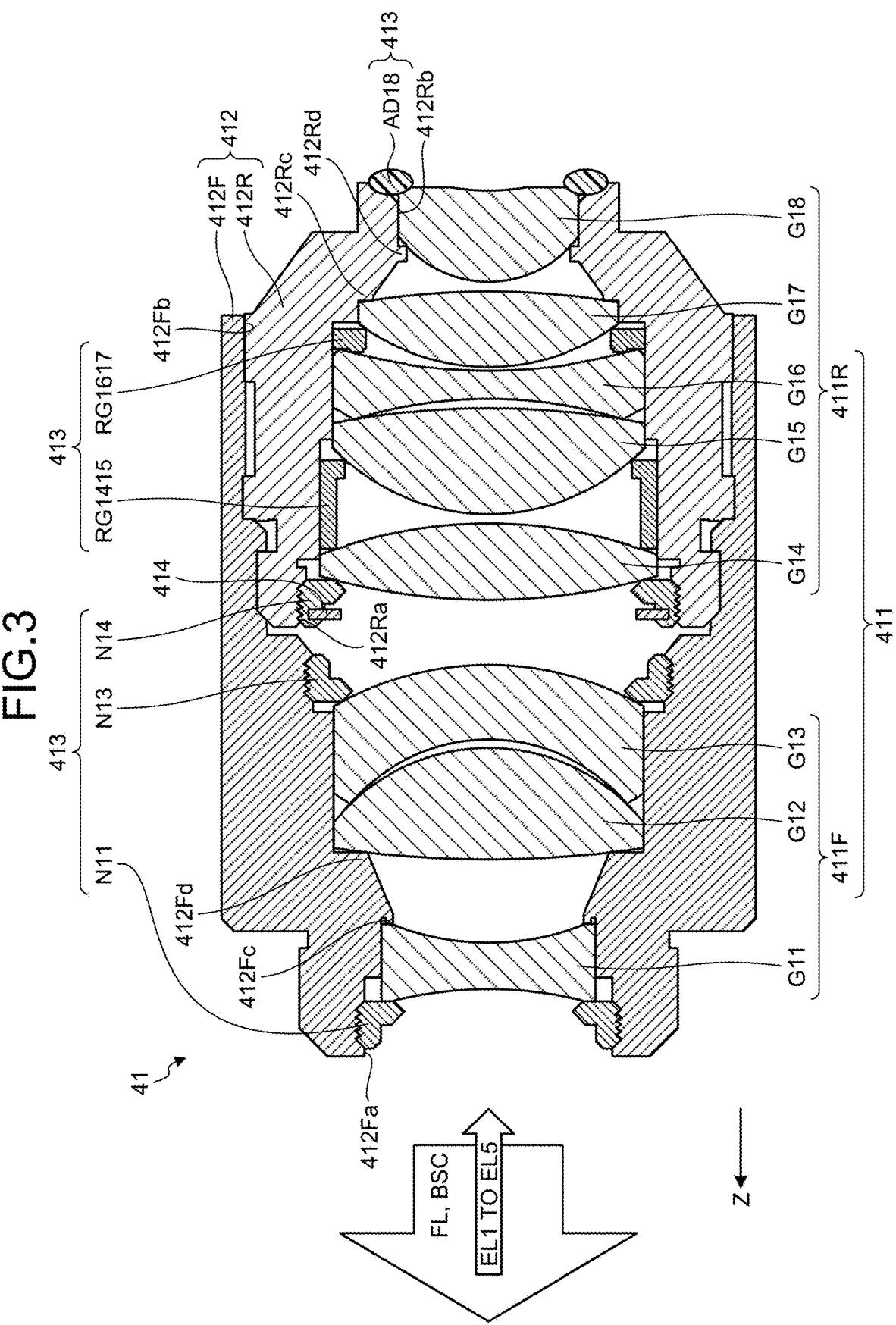
FIG. 3 is a view illustrating a schematic configuration example of a lens structure in a first embodiment and Example 1.

FIG. 3 is a view illustrating a schematic configuration example of the lens structure in the first embodiment and Example 1. FIG. 3 illustrates an example of a cross-sectional structure when the lens structure is cut along a plane including the optical axis of the excitation light EL1 and the like. An exemplified lens structure 41 includes a plurality of lenses 411, a lens frame 412, a fixing member 413, and an aperture stop 414. A focal length is 5 mm, the number of lenses is eight, a numerical aperture NA is 0.85, and an objective field of view $\phi$ is 0.6 mm.

The plurality of lenses 411 are disposed along the optical axis (Z-axis direction) of the excitation light EL1 and the like. In this example, the plurality of lenses 411 include a lens G11 to a lens G18 sequentially disposed in the negative Z-axis direction. The lens G11 to the lens G13 constitute a front lens group 411F disposed on the positive Z-axis direction side. The lens G14 to the lens G18 constitute a rear lens group 411R disposed on the negative Z-axis direction side.

The front lens group 411F and the rear lens group 411R are configured to provide the retrofocus configuration. Specifically, the front lens group 411F has a negative refractive index or has substantially no power when viewed along the negative Z-axis direction. The rear lens group 411R has a positive refractive index. Outer shapes of the lens G11 to the lens G13 constituting the front lens group 411F may be substantially larger in the negative Z-axis direction. Outer shapes of the lens G14 to the lens G18 constituting the rear lens group 411R may be substantially smaller in the negative Z-axis direction.

Some adjacent lenses abut on each other and constitute a cemented division group (marginal contact (bump)). In this example, the lens G12 and the lens G13 constitute a cemented division group. The lens G15 and the lens G16 constitute a cemented division group.

The lens frame 412 is a frame body that holds the plurality of lenses 411. The lens frame 412 includes a front frame body 412F and a rear frame body 412R. The front frame body 412F is a frame body constituting a portion of the lens frame 412 on the positive Z-axis direction side. The rear frame body 412R is a frame body constituting a portion of the lens frame 412 on the negative Z-axis direction side. The lens frame 412 may have a lens barrel shape. In this case, the front frame body 412F is a front lens barrel constituting a front portion of the lens barrel shape. The rear frame body 412R is a rear lens barrel constituting a rear portion of the lens barrel shape.

A material of the lens frame 412 is, for example, metal such as aluminum or brass, an alloy, or the like. However, various materials may be adopted in consideration of price, ease of processing, durability, and the like without being limited to these materials.

The lens frame 412 has a configuration suitable for lens accommodation (fitting), positioning, and the like. Several characteristic portions of lens frame 412 are illustrated with reference signs.

The front frame body 412F includes an opening portion 412Fa, an opening portion 412Fb, a protruding portion 412Fc, and a protruding portion 412Fd. The opening portion 412Fa opens an end of the front frame body 412F on the positive Z-axis direction side. The opening portion 412Fb opens an end of the front frame body 412F on the negative Z-axis direction side. The protruding portion 412Fc and the protruding portion 412Fd protrude toward the inner side of the front frame body 412F between the lens G11 and the lens G12. The lens G11 abuts on the protruding portion 412Fc, and the lens G12 abuts on the protruding portion 412Fd.

The rear frame body 412R includes an opening portion 412Ra, an opening portion 412Rb, a protruding portion 412Rc, and a protruding portion 412Rd. The opening portion 412Ra opens an end of the rear frame body 412R on the positive Z-axis direction side. The opening portion 412Rb opens an end of the rear frame body 412R on the negative Z-axis direction side. The protruding portion 412Rc and the protruding portion 412Rd protrude toward the inner side of the rear frame body 412R between the lens G17 and the lens G18. The lens G17 abuts on the protruding portion 412Rc, and the lens G18 abuts on the protruding portion 412Rd.

Note that the lens frame 412 may have an air hole configured to release internal air when the plurality of lenses 411 are fitted into the lens frame 412 although not illustrated.

The fixing member 413 fixes positions of the plurality of lenses 411 such that the plurality of lenses 411 are positioned inside the lens frame 412. In this example, the fixing member 413 includes a screw N11, a screw N13, a screw N14, a ring RG1415, a ring RG1617, and an adhesive AD18. The ring RG1415 is disposed so as to provide a space between the lens G14 and the lens G15. The ring RG1617 is disposed so as to provide a space between the lens G16 and the lens G17.

Examples of materials of the screw N11, the ring RG1415, and the like are metal such as aluminum or copper, an alloy, or the like. However, various materials may be adopted in consideration of price, ease of processing, durability, and the like without being limited to these materials.

The lens G11 is positioned by the screw N11 and the protruding portion 412Fc of the front frame body 412F. The lens G11 is fitted into the front frame body 412F from the opening portion 412Fa of the front frame body 412F such that an edge of the lens G11 abuts on the protruding portion 412Fc. The screw N11 presses (biases) and fixes the edge of the lens G11 with respect to the protruding portion 412Fc in the negative Z-axis direction.

The lens G12 and the lens G13 are positioned by the screw N13 and the protruding portion 412Fd of the front frame body 412F. The lens G12 and the lens G13 are fitted into the front frame body 412F from the opening portion 412Fb of the front frame body 412F such that an edge of the lens G12 abuts on the protruding portion 412Fd. The screw N13 presses and fixes edges of the lens G13 and the lens G12 with respect to the protruding portion 412Fd in the positive Z-axis direction.

The lens G14 to the lens G17 are positioned by the screw N14, screw ring RG1415, screw ring RG1617, and screw protruding portion 412Rc of screw rear frame body 412R. The lens G14 to the lens G17, the ring RG1415, and the ring RG1617 are fitted into the rear frame body 412R from the opening portion 412Ra of the rear frame body 412R such that an edge of the lens G17 abuts on the protruding portion 412Rc. The screw N14 presses and fixes an edge of the lens G14, the ring RG1415, edges of the lens G15 and the lens G16, the ring RG1617, and the edge of the lens G17 with respect to the protruding portion 412Rc in the negative Z-axis direction.

The lens G18 is positioned by the adhesive AD18 and the protruding portion 412Rd of the rear frame body 412R. The lens G18 is fitted into the rear frame body 412R from the opening portion 412Rb of the rear frame body 412R such that an edge of the lens G18 abuts on the protruding portion 412Rd. The adhesive AD18 fixes the lens G18 to the rear frame body 412R on the outer side of the rear frame body 412R. Since the lens G18 is not sealed by the rear frame body 412R, the adhesive AD18 may be used. Note that the edge of the lens G18 may be pressed and fixed with respect to the protruding portion 412Rd in the negative Z-axis direction, for example, by a cap having an opening at the center without using the adhesive AD18.

The rear frame body 412R is fitted into the front frame body 412F from the opening portion 412Fb of the front frame body 412F, and the lens structure 41 in which the plurality of lenses 411 are positioned inside the lens frame 412 is obtained.

The aperture stop 414 is provided between the front lens group 411F and the rear lens group 411R, and adjusts the amount of passing light. For example, the amount of light incident from the front lens group 411F to the rear lens group 411R is suppressed.

Figure 4:
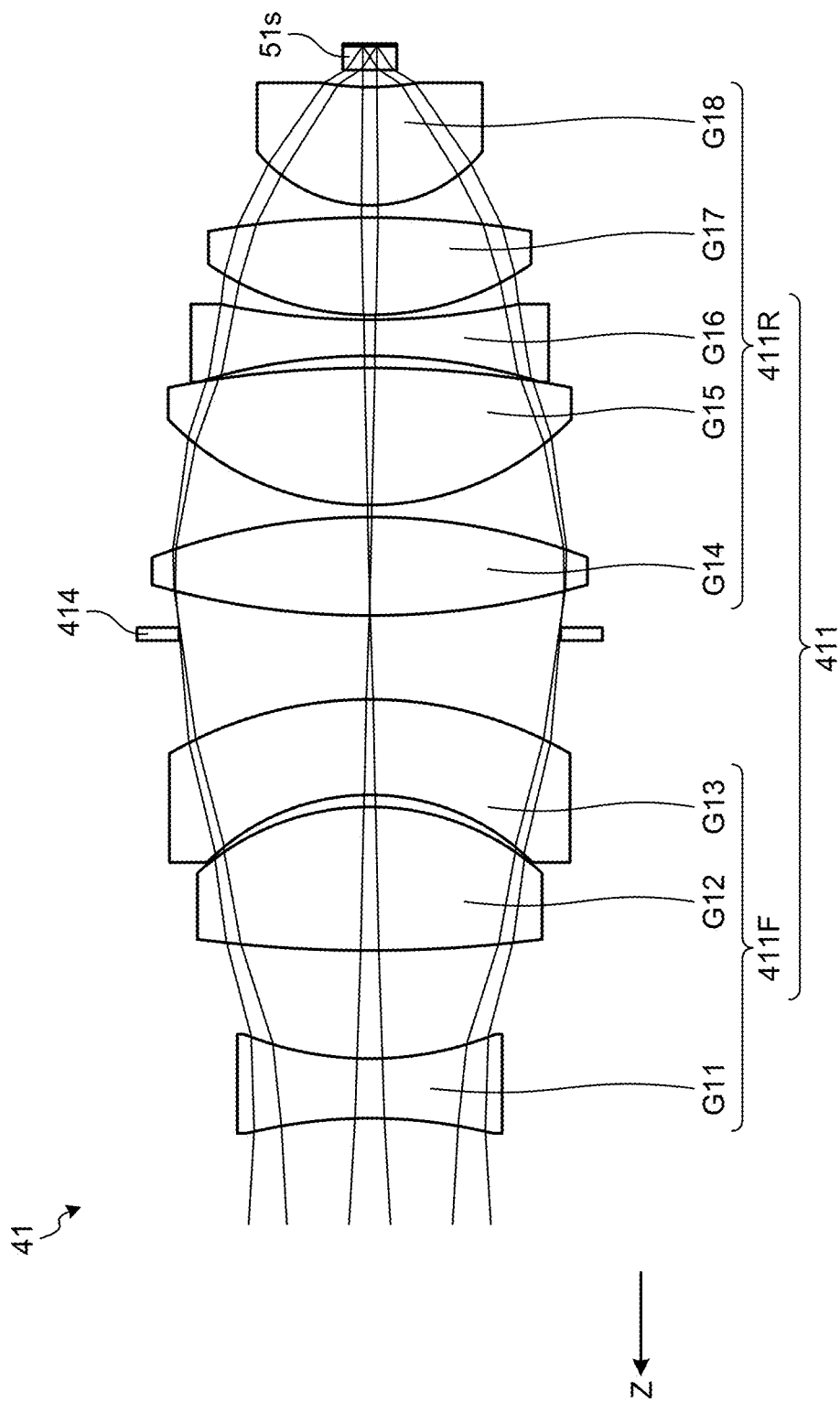
FIG. 4 is a view illustrating a schematic configuration example of the lens structure in the first embodiment and Example 1.

FIG. 4 is a view illustrating a schematic configuration example of the lens structure in the first embodiment and Example 1. FIG. 4 schematically illustrates several paths (optical paths) of light passing through the lens structure. As traveling in the negative Z-axis direction, light is substantially diffused in the front lens group 411F, and light is substantially collected in the rear lens group 411R. Therefore, the lens structure 41 collects the excitation light EL1 and the like on the spot 51s, and collects the fluorescence FL and the scattered light BSC toward the detection unit 7 (FIG. 1). The intensity of the excitation light EL1 and the like with which the particle 51 is irradiated is increased, and light to be detected by the detection unit 7 is efficiently guided to the detection unit 7.

FIG. 5 is a view illustrating an example of lens design in the first embodiment and Example 1. The convex indicates positive power, and the concave indicates negative power. The plurality of lenses 411 are designed to satisfy the first design condition to the fifth design condition described above.

Regarding the first design condition, the lens frame 412 holds the plurality of lenses 411 without using an adhesive in the lens frame 412. The adjacent lens G12 and lens G13 abut on each other to constitute the cemented division group which is positioned inside the lens frame 412. The adjacent lens G15 and lens G16 also constitute the cemented division group.

Regarding the second design condition, the lens G18 is a positive lens that is located closest to the particle 51 side and has positive power. A glass material of the lens G18 has nd=1.8040 and vd=46.5. Therefore, (1) 1.73<nd<1.83 and (2) 45<vd are satisfied.

Regarding the third design condition, the lens G12, the lens G14, the lens G15, and the lens G17 are positive lenses (three or more positive lenses). A glass material of these lenses has nd=1.4388, vd=95.0, and PgF=0.5340. Therefore, (3) nd<1.52, (4) 79<vd, and (5) PgF<0.54 are satisfied.

Regarding the fourth design condition, the lens G11, the lens G13, and the lens G16 are negative lenses (two or more negative lenses). A glass material of the lens G11 has nd=1.4875 and vd=70.2. A glass material of the lens G13 has nd=1.5891 and vd=61.2. A glass material of the lens G16 has nd=1.7380 and vd=32.3. Therefore, (6) nd<1.78 and (7) 29<vd are satisfied.

Regarding the fifth design condition, the lens G11 to the lens G13 correspond to the front lens group 411F having the negative refractive index or substantially no power. The lens G14 to the lens G18 correspond to the rear lens group 411R having the positive refractive index. A focal length of the front lens group 411F (the lens G11 to the lens G13) is f1=−54.60 mm. A focal length of the rear lens group 411R (the lens G14 to the lens G18) is f2=8.86 mm. A focal length of the whole of the plurality of lenses 411 (the lens G11 to the lens G18) is ft=5.00 mm. ft/f1=−0.092. ft/f2=0.565. Therefore, (8) −0.24<ft/f1<0.08 and (9) 0.35<ft/f2<0.7 are satisfied.

1.8. Lens Structure in First Embodiment and Example 2

Figure 6:
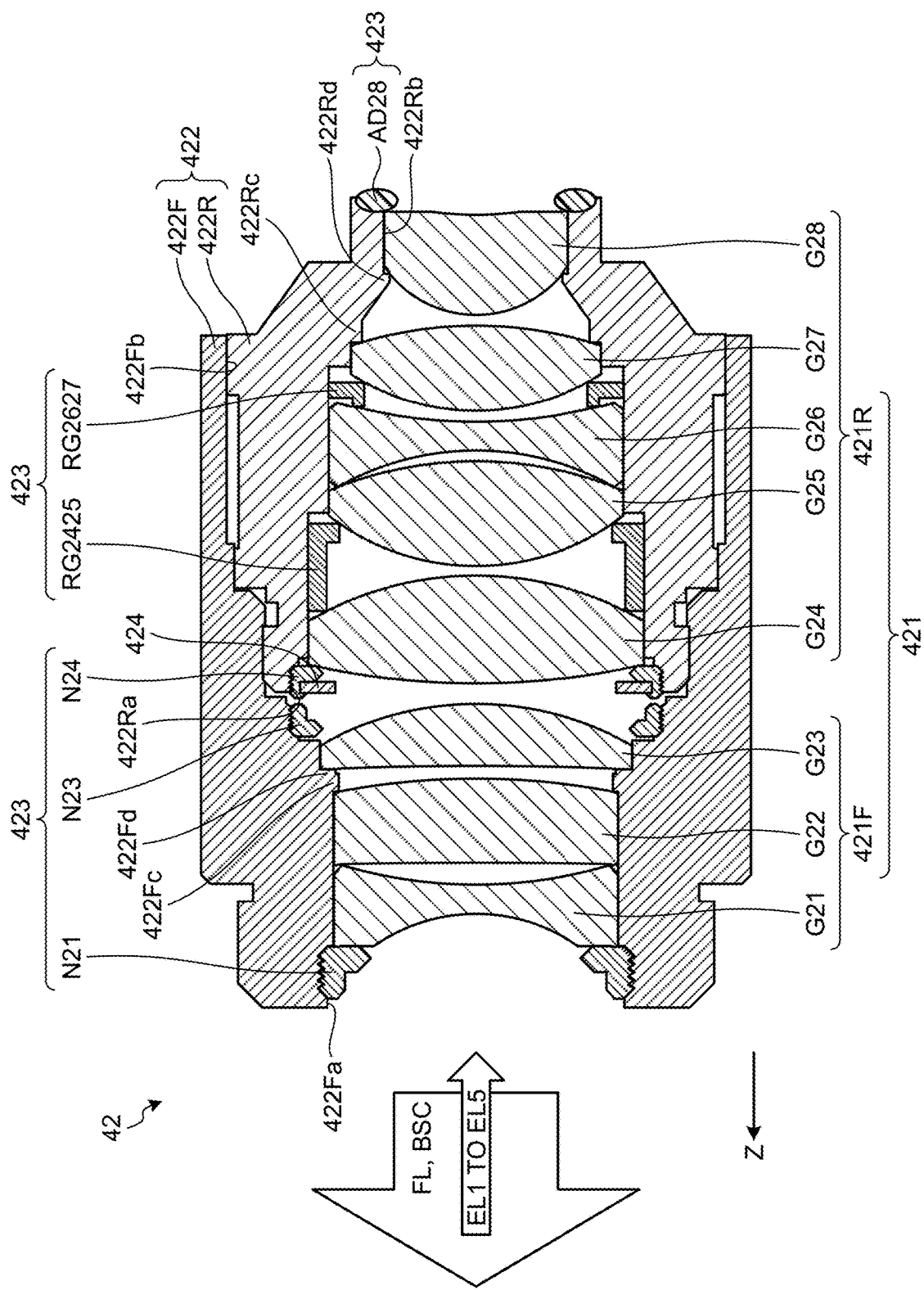
FIG. 6 is a view illustrating a schematic configuration example of a lens structure in the first embodiment and Example 2.
Figure 7:
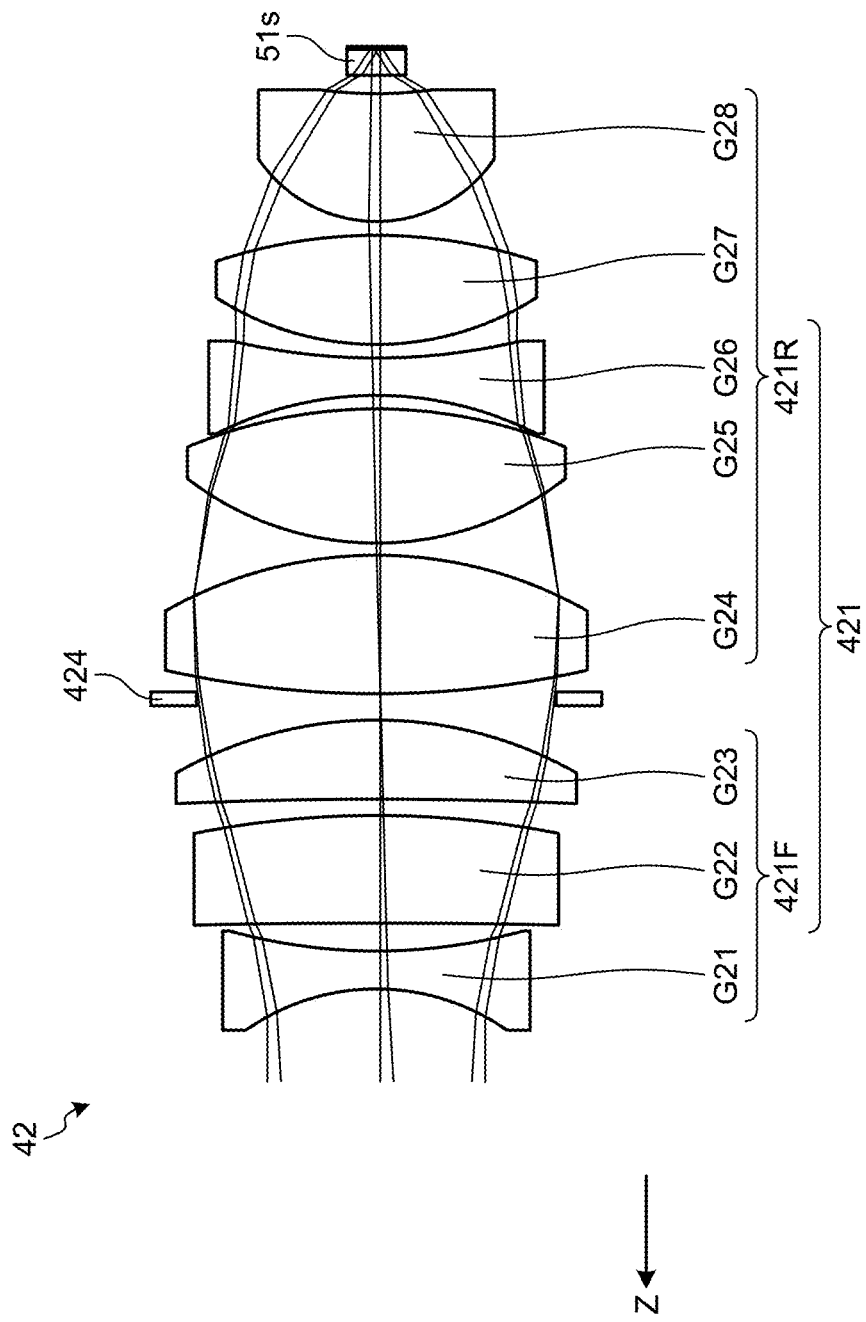
FIG. 7 is a view illustrating a schematic configuration example of the lens structure in the first embodiment and Example 2.

FIGS. 6 and 7 are views illustrating schematic configuration examples of the lens structure in the first embodiment and Example 2. An exemplified lens structure 42 includes a plurality of lenses 421, a lens frame 422, a fixing member 423, and an aperture stop 424. A focal length is 5 mm, the number of lenses is eight, a numerical aperture NA is 0.85, and an objective field of view $\phi$ is 0.6 mm.

The plurality of lenses 421 include a lens G21 to a lens G23 constituting a front lens group 421F and a lens G24 to a lens G28 constituting a rear lens group 421R. The lens G21 and the lens G22 constitute a cemented division group. The lens G25 and the lens G26 also constitute a cemented division group.

The lens frame 422 includes a front frame body 422F and a rear frame body 422R. The front frame body 422F includes an opening portion 422Fa, an opening portion 422Fb, a protruding portion 422Fc, and a protruding portion 422Fd. The rear frame body 422R includes an opening portion 422Ra, an opening portion 422Rb, a protruding portion 422Rc, and a protruding portion 422Rc. The fixing member 423 includes a screw N21, a screw N23, a screw N24, a ring RG2425, a ring RG2627, and an adhesive AD28. The ring RG2425 is disposed so as to provide a space between the lens G24 and the lens G25. The ring RG2627 is disposed so as to provide a space between the lens G26 and the lens G27. The aperture stop 424 is provided between the front lens group 421F and the rear lens group 421R, and adjusts the amount of passing light.

The lens G21 and the lens G22 are positioned by the screw N21 and the protruding portion 422Fc of the front frame body 422F. The lens G21 and the lens G22 are fitted into the front frame body 422F from the opening portion 422Fa of the front frame body 422F such that an edge of the lens G22 abuts on the protruding portion 422Fc. The screw N21 presses and fixes edges of the lens G21 and the lens G22 with respect to the protruding portion 422Fc in the negative Z-axis direction.

The lens G23 is positioned by the screw N23 and the protruding portion 422Fd of the front frame body 422F. The lens G23 is fitted into the front frame body 422F from the opening portion 422Fb of the front frame body 422F such that an edge of the lens G23 abuts on the protruding portion 422Fd. The screw N23 presses and fixes the edge of the lens G23 with respect to the protruding portion 422Fd in the positive Z-axis direction.

The lens G24 to the lens G27 are positioned by the screw N24, the ring RG2425, the ring RG2627, and the protruding portion 422Rc of the rear frame body 422R. The lens G24 to the lens G27, the ring RG2425, and the ring RG2627 are fitted into the rear frame body 422R from the opening portion 422Ra of the rear frame body 422R such that an edge of the lens G27 abuts on the protruding portion 422Rc. The screw N24 presses and fixes an edge of the lens G24, the ring RG2425, edges of the lens G25 and the lens G26, the ring RG2627, and an edge of the lens G27 with respect to the protruding portion 422Rc in the negative Z-axis direction.

The lens G28 is positioned by the adhesive AD28 and the protruding portion 422Rd of the rear frame body 422R. The lens G28 is fitted into the rear frame body 422R from the opening portion 422Rb of the rear frame body 422R such that an edge of the lens G28 abuts on the protruding portion 422Rd. The adhesive AD28 fixes the lens G28 to the rear frame body 422R on the outer side of the rear frame body 422R.

The rear frame body 422R is fitted into the front frame body 422F from the opening portion 422Fb of the front frame body 422F, and the lens structure 42 in which the plurality of lenses 421 are positioned inside the lens frame 422 is obtained.

As traveling in the negative Z-axis direction, light is substantially diffused in the front lens group 421F, and light is substantially collected in the rear lens group 421R as illustrated in FIG. 7.

FIG. 8 is a view illustrating an example of lens design in the first embodiment and Example 2. The plurality of lenses 421 are designed to satisfy the first design condition to the fifth design condition described above.

Regarding the first design condition, the lens frame 422 holds the plurality of lenses 421 without using an adhesive in the lens frame 422. The adjacent lens G21 and lens G22 abut on each other to constitute the cemented division group which is positioned inside the lens frame 422. The adjacent lens G25 and lens G26 also constitute the cemented division group.

Regarding the second design condition, the lens G28 is a positive lens that is located closest to the particle 51 side and has positive power. A glass material of the lens G28 has nd=1.8040 and vd=46.5. Therefore, (1) 1.73<nd<1.83 and (2) 45<vd are satisfied.

Regarding the third design condition, the lens G23, the lens G24, the lens G25, and the lens G27 are positive lenses (three or more positive lenses). A glass material of these lenses has nd=1.4388, vd=95.0, and PgF=0.5340. Therefore, (3) nd<1.52, (4) 79<vd, and (5) PgF<0.54 are satisfied.

Regarding the fourth design condition, the lens G21 and the lens G26 are negative lenses (two or more negative lenses). A glass material of the lens G21 has nd=1.4970 and vd=81.6. A glass material of the lens G26 has nd=1.7380 and vd=32.3. Therefore, (6) nd<1.78 and (7) 29<vd are satisfied.

Regarding the fifth design condition, the lens G21 to the lens G23 correspond to the front lens group 421F having the negative refractive index or substantially no power. The lens G24 to the lens G28 correspond to the rear lens group 421R having the positive refractive index. A focal length of the front lens group 421F (the lens G21 to the lens G23) is f1=−46.08 mm. A focal length of the rear lens group 421R (the lens G24 to the lens G28) is f2=8.18 mm. A focal length of the whole of the plurality of lenses 421 (the lens G21 to the lens G28) is ft=5.00 mm. ft/f1=−0.109. ft/f2=0.611. Therefore, (8) −0.24<ft/f1<0.08 and (9) 0.35<ft/f2<0.7 are satisfied.

1.9. Lens Structure in First Embodiment and Example 3

Figure 9:
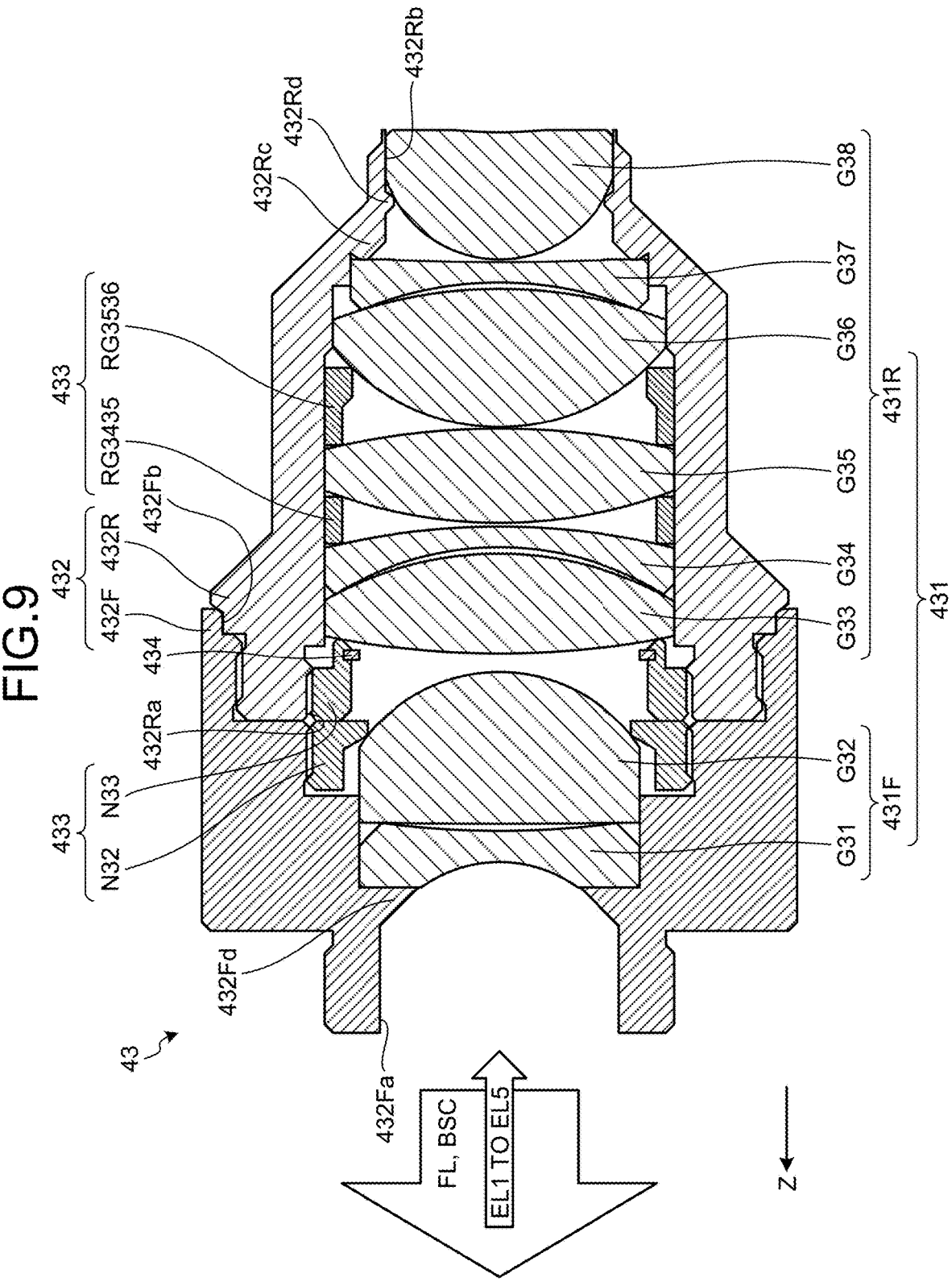
FIG. 9 is a view illustrating a schematic configuration example of a lens structure in the first embodiment and Example 3.
Figure 10:
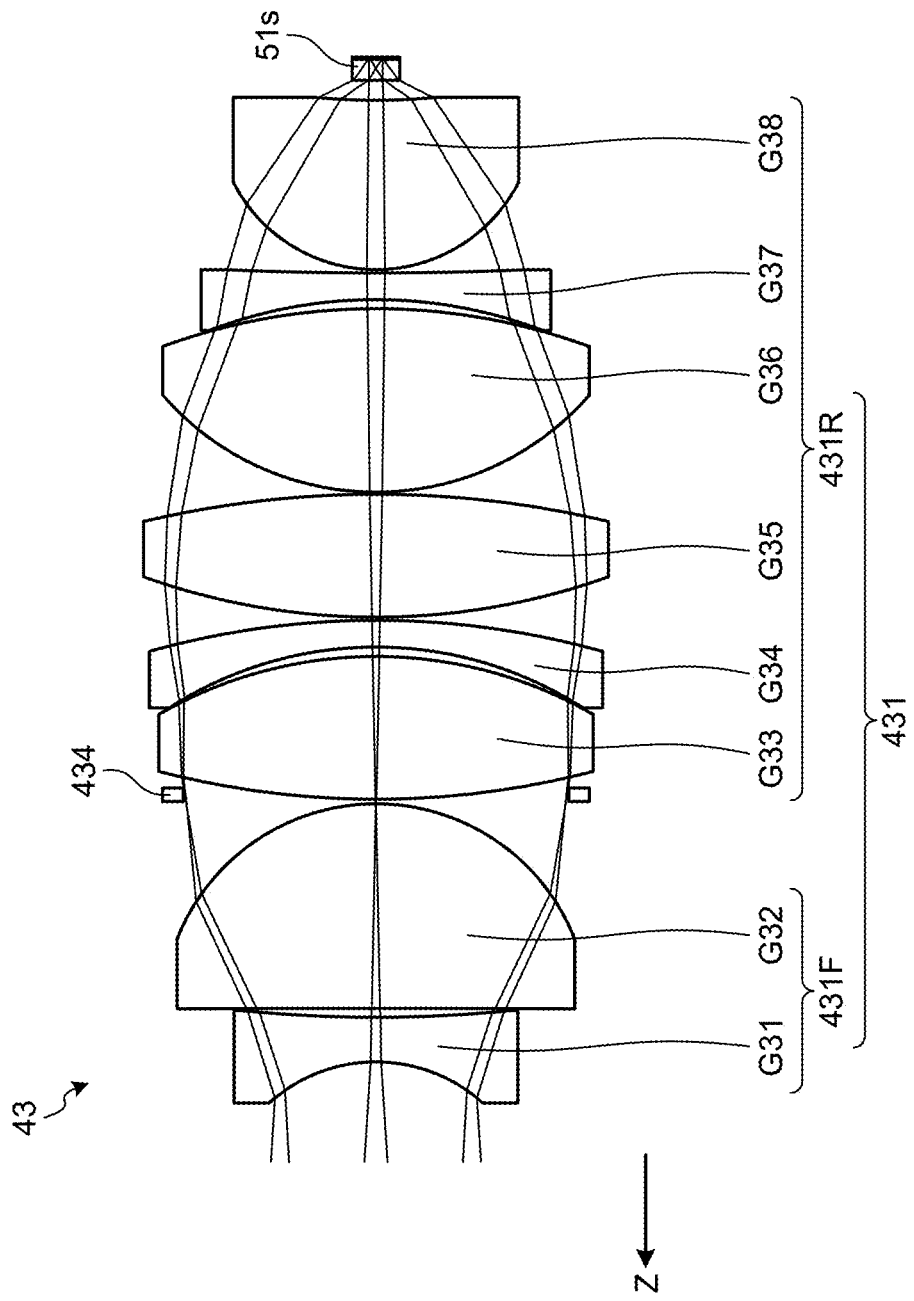
FIG. 10 is a view illustrating a schematic configuration example of the lens structure in the first embodiment and Example 3.

FIGS. 9 and 10 are views illustrating schematic configuration examples of the lens structure in the first embodiment and Example 3. An exemplified lens structure 43 includes a plurality of lenses 431, a lens frame 432, a fixing member 433, and an aperture stop 434. A focal length is 5 mm, the number of lenses is eight, a numerical aperture NA is 0.85, and an objective field of view φ is 0.6 mm.

The plurality of lenses 431 include a lens G31 and a lens G32 constituting a front lens group 431F, and a lens G33 to a lens G38 constituting a rear lens group 431R. The lens G31 and the lens G32 constitute a cemented division group. The lens G33 and the lens G34 also constitute a cemented division group. The lens G36 and the lens G37 also constitute a cemented division group.

The lens frame 432 includes a front frame body 432F and a rear frame body 432R. The front frame body 432F includes an opening portion 432Fa, an opening portion 432Fb, and a protruding portion 432Fd. The rear frame body 432R includes an opening portion 432Ra, an opening portion 432Rb, a protruding portion 432Rc, and a protruding portion 432Rd. The fixing member 433 includes a screw N32, a screw N33, a ring RG3435, and a ring RG3536. The ring RG3435 is disposed so as to provide a space between the lens G34 and the lens G35. The ring RG3536 is disposed so as to provide a space between the lens G35 and the lens G36. The aperture stop 434 is provided between the front lens group 431F and the rear lens group 431R, and adjusts the amount of passing light.

The lens G31 and the lens G32 are positioned by the screw N32 and the protruding portion 432Fd of the front frame body 432F. The lens G31 and the lens G32 are fitted into the front frame body 432F from the opening portion 432Fa of the front frame body 432F such that an edge of the lens G31 abuts on the protruding portion 432Fd. The screw N32 presses and fixes edges of the lens G32 and the lens G31 with respect to the protruding portion 432Fd in the positive Z-axis direction.

The lens G33 to the lens G37 are positioned by the screw N33, the ring RG3435, the ring RG3536, and the protruding portion 432Rc of the rear frame body 432R. The lens G33 to the lens G37, the ring RG3435, and the ring RG3536 are fitted into the rear frame body 432R from the opening portion 432Ra of the rear frame body 432R such that an edge of the lens G37 abuts on the protruding portion 432Rc. The screw N33 presses and fixes edges of the lens G33 and the lens G34, the ring RG3435, an edge of the lens G35, the ring RG3536, and edges of the lens G36 and the lens G37 with respect to the protruding portion 432Rc in the negative Z-axis direction.

The lens G38 is positioned by the protruding portion 432Rd of the rear frame body 432R. The lens G38 is fitted into the rear frame body 432R from the opening portion 432Rb of the rear frame body 432R such that an edge of the lens G38 abuts on the protruding portion 432Rd. Although not illustrated, the lens G38 may be fixed to the rear frame body 432R with an adhesive or the like on the outer side of the rear frame body 432R.

The rear frame body 432R is fitted into the front frame body 432F from the opening portion 432Fb of the front frame body 432F, and the lens structure 43 in which the plurality of lenses 431 are positioned inside the lens frame 432 is obtained.

As traveling in the negative Z-axis direction, light is substantially diffused in the front lens group 431F, and light is substantially collected in the rear lens group 431R as illustrated in FIG. 10.

FIG. 11 is a view illustrating an example of lens design in the first embodiment and Example 3. The plurality of lenses 431 are designed to satisfy the first design condition to the fifth design condition described above.

Regarding the first design condition, the lens frame 432 holds the plurality of lenses 431 without using an adhesive in the lens frame 432. The adjacent lens G31 and lens G32 abut on each other to constitute the cemented division group which is positioned inside the lens frame 432. The adjacent lens G33 and lens G34, and the adjacent G36 and lens G37 also constitute cemented division groups.

Regarding the second design condition, the lens G38 is a positive lens that is located closest to the particle 51 side and has positive power. A glass material of the lens G38 has nd=1.7550 and vd=52.3. Therefore, (1) 1.73<nd<1.83 and (2) 45<vd are satisfied.

Regarding the third design condition, the lens G32, the lens G33, the lens G35, and the lens G36 are positive lenses (three or more positive lenses). A glass material of these lenses has nd=1.4388, vd=95.0, and PgF=0.5340. Therefore, (3) nd<1.52, (4) 79<vd, and (5) PgF<0.54 are satisfied.

Regarding the fourth design condition, the lens G31, the lens G34, and the lens G37 are negative lenses (two or more negative lenses). A glass material of the lens G31 and the lens G34 have nd=1.7550 and vd=52.3. A glass material of the lens G37 has nd=1.7380 and vd=32.3. Therefore, (6) nd<1.78 and (7) 29<vd are satisfied.

Regarding the fifth design condition, the lens G31 and the lens G32 correspond to the front lens group 431F having the negative refractive index or substantially no power. The lens G33 to the lens G38 correspond to the rear lens group 431R having the positive refractive index. A focal length of the front lens group 431F (the lens G31 and the lens G32) is f1=−31.49 mm. A focal length of the rear lens group 431R (the lens G33 to the lens G38) is f2=10.34 mm. A focal length of the whole of the plurality of lenses 431 (the lens G31 to the lens G38) is ft=5.00 mm. ft/f1=−0.159. ft/f2=0.483. Therefore, (8) −0.24<ft/f1<0.08 and (9) 0.35<ft/f2<0.7 are satisfied.

1.10. Lens Structure in First Embodiment and Example 4

Figure 12:
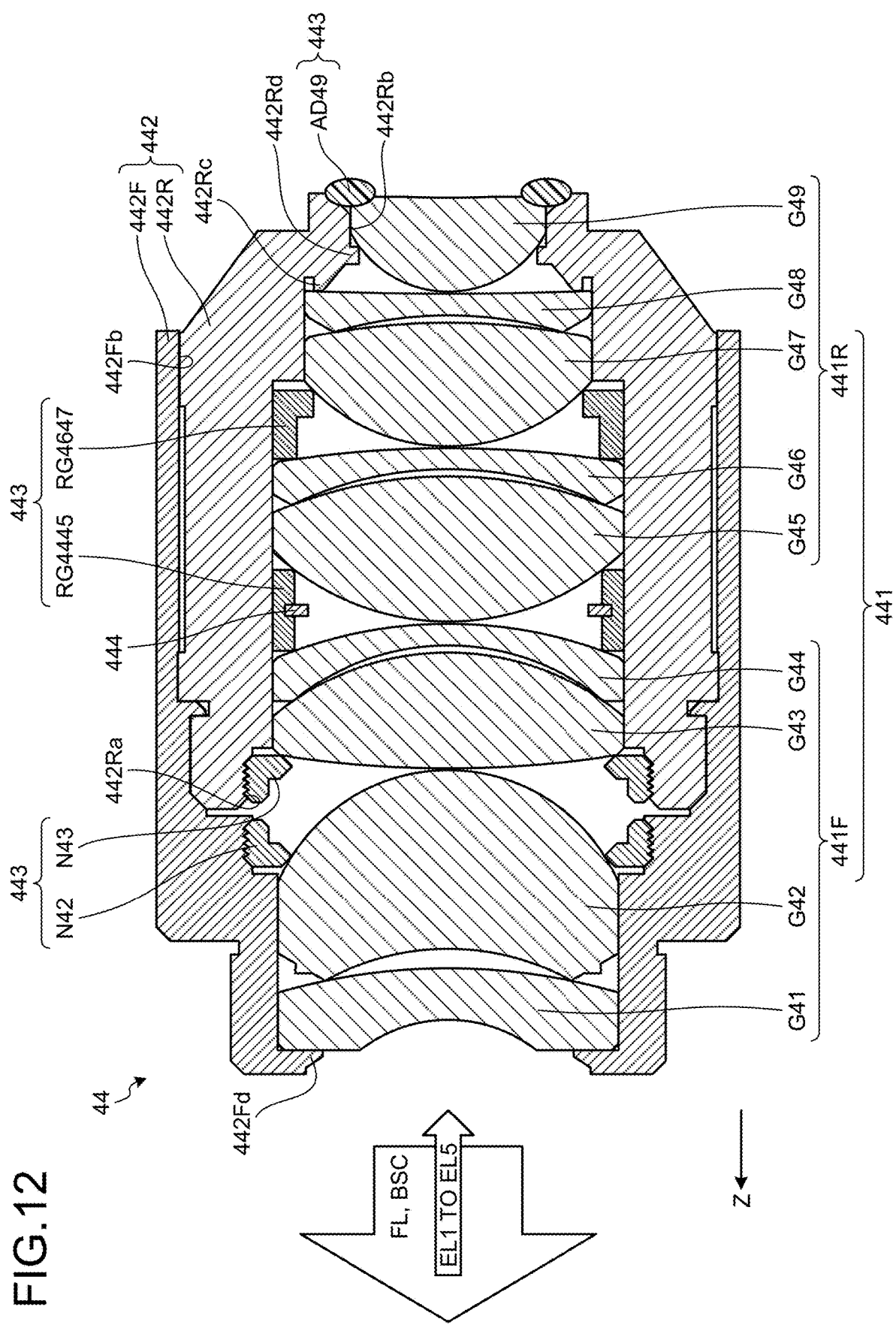
FIG. 12 is a view illustrating a schematic configuration example of a lens structure in the first embodiment and Example 4.
Figure 13:
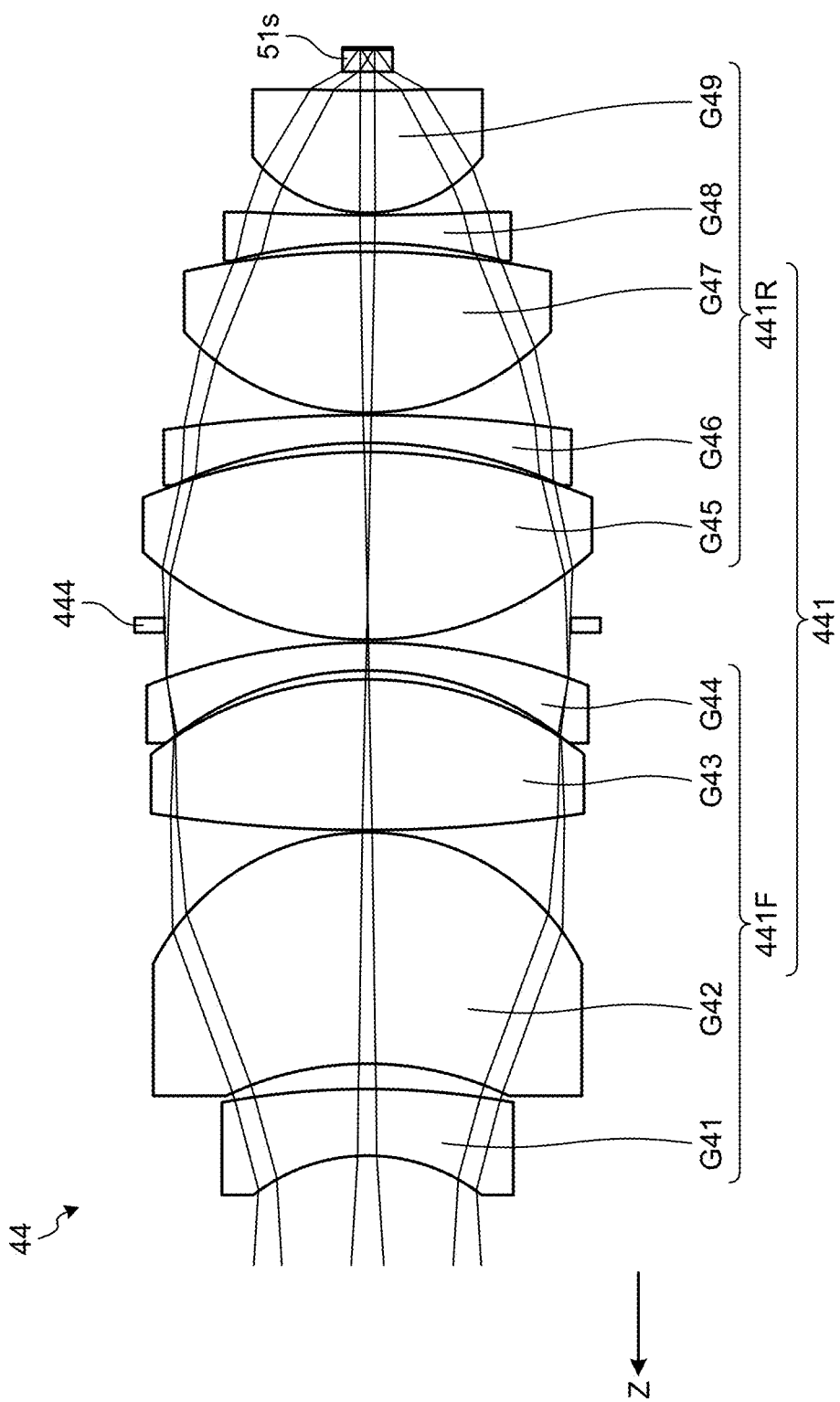
FIG. 13 is a view illustrating a schematic configuration example of the lens structure in the first embodiment and Example 4.

FIGS. 12 and 13 are views illustrating schematic configuration examples of the lens structure in the first embodiment and Example 4. An exemplified lens structure 44 includes a plurality of lenses 441, a lens frame 442, a fixing member 443, and an aperture stop 444. A focal length is 5 mm, the number of lenses is nine, a numerical aperture NA is 0.85, and an objective field of view φ is 0.6 mm.

The plurality of lenses 441 include a lens G41 to a lens G44 constituting a front lens group 441F and a lens G45 to a lens G49 constituting a rear lens group 441R. The lens G41 and the lens G42 constitute a cemented division group. The lens G43 and the lens G44 also constitute a cemented division group. The lens G45 and the lens G46 also constitute a cemented division group. The lens G47 and the lens G48 also constitute a cemented division group.

The lens frame 442 includes a front frame body 442F and a rear frame body 442R. The front frame body 442F includes an opening portion 442Fa, an opening portion 442Fb, and a protruding portion 442Fd. The rear frame body 442R includes an opening portion 442Ra, an opening portion 442Rb, a protruding portion 442Rc, and a protruding portion 442Rd. The fixing member 443 includes a screw N42, a screw N43, a ring RG4445, a ring RG4647, and an adhesive AD49. The ring RG4445 is disposed so as to provide a space between the lens G44 and the lens G45. The ring RG4647 is disposed so as to provide a space between the lens G46 and the lens G47. The aperture stop 444 is provided between the front lens group 441F and the rear lens group 441R, and adjusts the amount of passing light.

The lens G41 and the lens G42 are positioned by the screw N42 and the protruding portion 442Fd of the front frame body 442F. The lens G41 and the lens G42 are fitted into the front frame body 442F from the opening portion 442Fb of the front frame body 442F such that an edge of the lens G41 abuts on the protruding portion 442Fd. The screw N42 presses and fixes edges of the lens G42 and the lens G41 with respect to the protruding portion 442Fd in the positive Z-axis direction.

The lens G43 to the lens G48 are positioned by the screw N43, the ring RG4445, the ring RG4647, and the protruding portion 442Rc of the rear frame body 442R. The lens G43 to the lens G48, the ring RG4445, and the ring RG4647 are fitted into the rear frame body 442R from the opening portion 442Ra of the rear frame body 442R such that an edge of the lens G48 abuts on the protruding portion 442Rc. The screw N43 presses and fixes edges of the lens G43 and the lens G44, the ring RG4445, edges of the lens G45 and the lens G46, the ring RG4647, and edges of the lens G47 and the lens G48 with respect to the protruding portion 442Rc in the negative Z-axis direction.

The lens G49 is positioned by the adhesive AD49 and the protruding portion 442Rd of the rear frame body 442R. The lens G49 is fitted into the rear frame body 442R from the opening portion 442Rb of the rear frame body 442R such that an edge of the lens G49 abuts on the protruding portion 442Rd. The adhesive AD49 fixes the lens G49 to the rear frame body 442R on the outer side of the rear frame body 442R.

The rear frame body 442R is fitted into the front frame body 442F from the opening portion 442Fb of the front frame body 442F, and the lens structure 44 in which the plurality of lenses 441 are positioned inside the lens frame 442 is obtained.

As traveling in the negative Z-axis direction, light is substantially diffused in the front lens group 441F, and light is substantially collected in the rear lens group 441R as illustrated in FIG. 13.

FIG. 14 is a view illustrating an example of lens design in the first embodiment and Example 4. The plurality of lenses 441 are designed to satisfy the first design condition to the fourth design condition described above.

Regarding the first design condition, the lens frame 442 holds the plurality of lenses 441 without using an adhesive in the lens frame 442. The adjacent lens G41 and lens G42 abut on each other to constitute the cemented division group which is positioned inside the lens frame 442. The adjacent lens G43 and lens G44, the adjacent G45 and lens G46, and the adjacent lens G47 and lens G48 also constitute cemented division groups.

Regarding the second design condition, the lens G49 is a positive lens that is located closest to the particle 51 side and has positive power. A glass material of the lens G49 has nd=1.7550 and vd=52.3. Therefore, (1) 1.73<nd<1.83 and (2) 45<vd are satisfied.

Regarding the third design condition, the lens G42, the lens G43, the lens G45, and the lens G47 are positive lenses (three or more positive lenses). A glass material of these lenses has nd=1.4388, vd=95.0, and PgF=0.5340. Therefore, (3) nd<1.52, (4) 79<vd, and (5) PgF<0.54 are satisfied.

Regarding the fourth design condition, the lens G41, the lens G44, the lens G46, and the lens G48 are negative lenses (two or more negative lenses). A glass material of the lens G41, the lens G44, and the lens G46 have nd=1.7550 and vd=52.3. A glass material of the lens G48 has nd=1.7380 and vd=32.3. Therefore, (6) nd<1.78 and (7) 29<vd are satisfied.

Regarding the fifth design condition, the lens G41 to the lens G44 correspond to the front lens group 441F having the negative refractive index or substantially no power. The lens G45 to the lens G49 correspond to the rear lens group 441R having the positive refractive index. A focal length of the front lens group 441F (the lens G41 to the lens G44) is f1=1346.90 mm. A focal length of the rear lens group 441R (the lens G45 to the lens G49) is f2=10.22 mm. A focal length of the whole of the plurality of lenses 441 (the lens G41 to the lens G49) is ft=5.00 mm. ft/f1=0.004. ft/f2=0.489. Therefore, (8) −0.24<ft/f1<0.08 and (9) 0.35<ft/f2<0.7 are satisfied.

1.11. Lens Structure in Second Embodiment and Example 5

Figure 15:
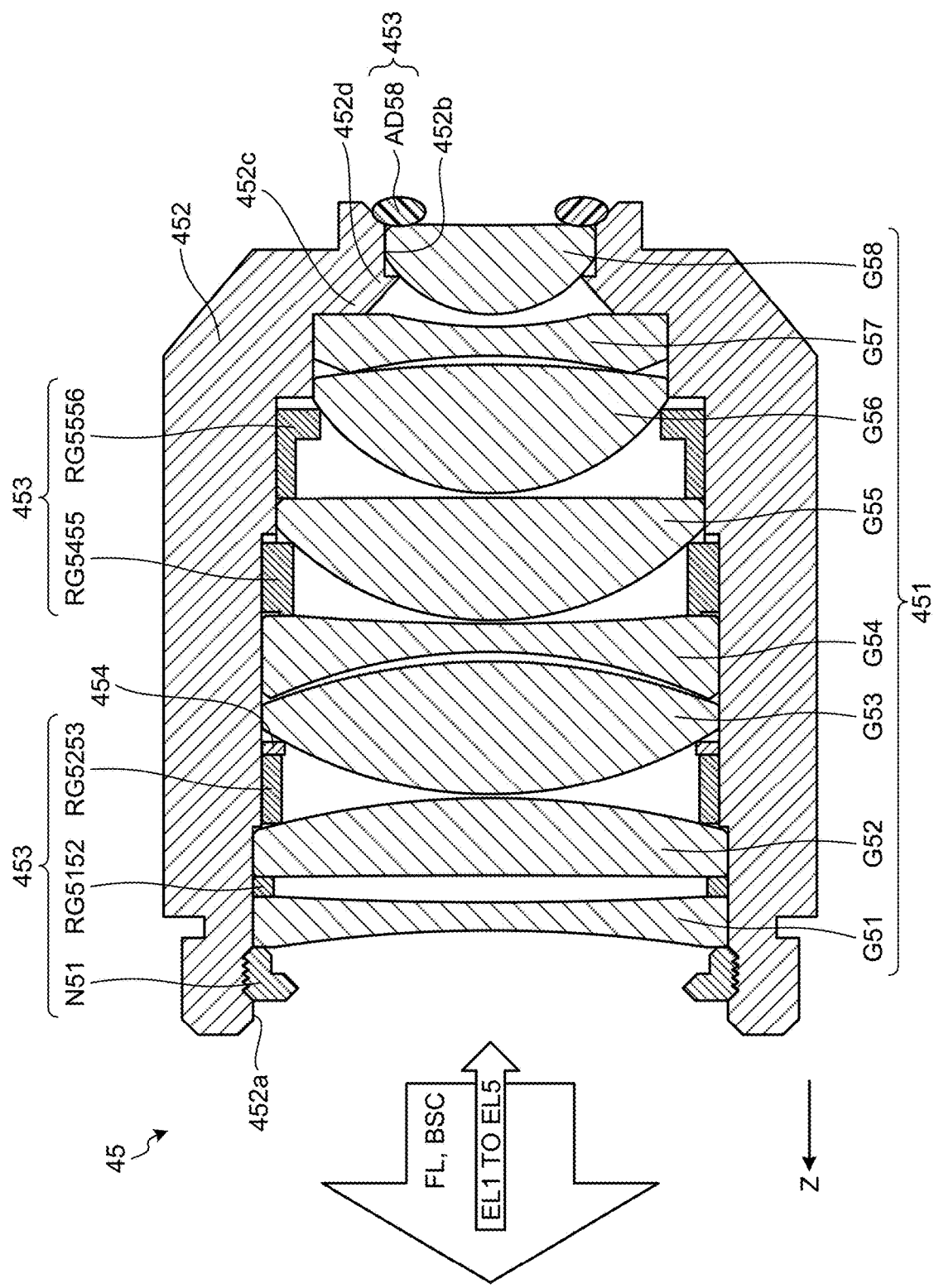
FIG. 15 is a view illustrating a schematic configuration example of a lens structure in a second embodiment and Example 5.
Figure 16:
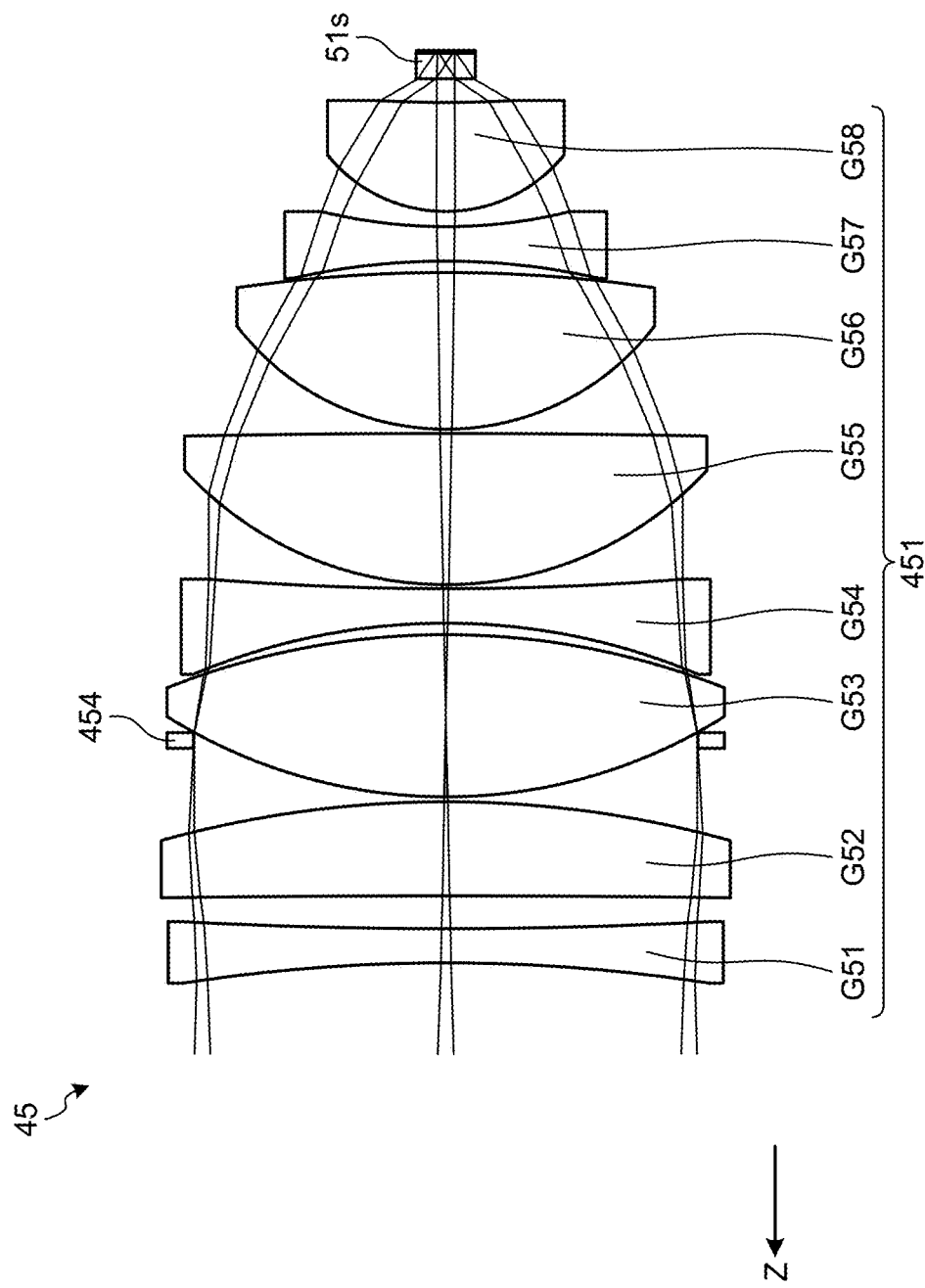
FIG. 16 is a view illustrating a schematic configuration example of the lens structure in the second embodiment and Example 5.

FIGS. 15 and 16 are views illustrating schematic configuration examples of the lens structure in the second embodiment and Example 5. An exemplified lens structure 45 includes a plurality of lenses 451, a lens frame 452, a fixing member 453, and an aperture stop 454. A focal length is 10 mm, the number of lenses is eight, a numerical aperture NA is 0.85, and an objective field of view φ is 0.6 mm.

The plurality of lenses 451 includes a lens G51 to a lens G58. The lens G53 and the lens G54 constitute a cemented division group. The lens G56 and the lens G57 also constitute a cemented division group.

The lens frame 452 includes an opening portion 452a, an opening portion 452b, a protruding portion 452c, and a protruding portion 452d. The fixing member 453 includes a screw N51, a ring RG5152, a ring RG5253, a ring RG5455, a ring RG5556, and an adhesive AD58. The ring RG5152 is disposed so as to provide a space between the lens G51 and the lens G52. The ring RG5253 is disposed so as to provide a space between the lens G52 and the lens G53. The ring RG5455 is disposed so as to provide a space between the lens G54 and the lens G55. The ring RG5556 is disposed so as to provide a space between the lens G55 and the lens G56. The aperture stop 454 is provided between the lens G52 and the lens G53, and adjusts the amount of passing light.

The lens G51 to the lens G57 are positioned by the screw N51, the ring RG5152, the ring RG5253, the ring RG5455, the ring RG5556, and the protruding portion 452c of the lens frame 452. The lens G51 to the lens G57, the ring RG5152, the ring RG5253, the ring RG5455, and the ring RG5556 are fitted into the lens frame 452 from the opening portion 452a of the lens frame 452 such that an edge of the lens G57 abuts on the protruding portion 452c. The screw N51 presses and fixes an edge of the lens G51, the ring RG5152, an edge of the lens G52, the ring RG5253, edges of the lens G53 and the lens G54, the ring RG5455, an edge of the lens G55, the ring RG5556, and edges of the lens G56 and the lens G57 with respect to the protruding portion 452c in the negative Z-axis direction.

The lens G58 is positioned by the adhesive AD58 and the protruding portion 452d of the lens frame 452. The lens G58 is fitted into the lens frame 452 from the opening portion 452b of the lens frame 452 such that an edge of the lens G58 abuts on the protruding portion 452d. The adhesive AD58 fixes the lens G58 to the lens frame 452 on the outer side of the lens frame 452.

The lens frame 452 is a single frame body, and the lens structure 45 in which the plurality of lenses 451 are positioned inside the lens frame 452 is obtained by the above fitting and fixing.

As traveling in the negative Z-axis direction, light is substantially collected in the plurality of lenses 451 as illustrated in FIG. 16.

FIG. 17 is a view illustrating an example of lens design in the second embodiment and Example 5. The plurality of lenses 421 are designed to satisfy the first design condition to the fourth design condition and the sixth design condition described above.

Regarding the first design condition, the lens frame 452 holds the plurality of lenses 451 without using an adhesive in the lens frame 452. The adjacent lens G53 and lens G54 abut on each other to constitute the cemented division group which is positioned inside the lens frame 452. The adjacent lens G56 and lens G57 also constitute the cemented division group.

Regarding the second design condition, the lens G58 is a positive lens that is located closest to the particle 51 side and has positive power. A glass material of the lens G58 has nd=1.7550 and νd=52.3. Therefore, (1) 1.73<nd<1.83 and (2) 45<νd are satisfied.

Regarding the third design condition, the lens G53, the lens G55, and the lens G56 are positive lenses (three or more positive lenses) corresponding to the third design condition. A glass material of these lenses has nd=1.4388, νd=95.0, and PgF=0.5340. Therefore, (3) nd<1.52, (4) 79<νd, and (5) PgF<0.54 are satisfied.

Regarding the fourth design condition, the lens G51, the lens G54, and the lens G57 are negative lenses (two or more negative lenses). A glass material of the lens G51 has nd=1.5952 and νd=67.7. A glass material of the lens G54 has nd=1.7550 and νd=52.3. A glass material of the lens G57 has nd=1.7380 and νd=32.3. Therefore, (6) nd<1.78 and (7) 29<νd are satisfied.

Regarding the sixth design condition, outer shapes of the plurality of lenses 451 become smaller from the incident side to the emission side of the excitation light EL1 and the like (in the negative Z-axis direction).

1.12. Example of Another Lens Structure in Second Embodiment

Figure 18:
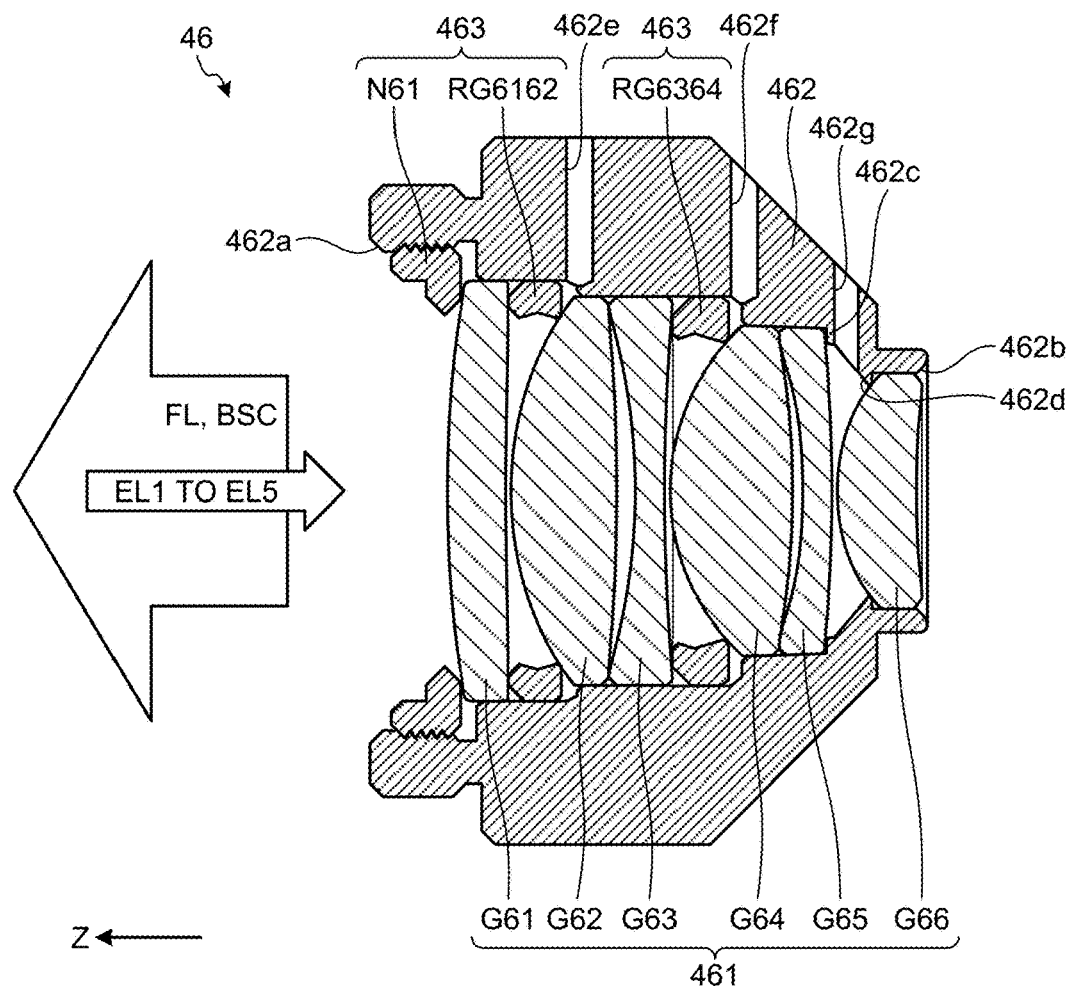
FIG. 18 is a view illustrating a schematic configuration example of another lens structure in the second embodiment.
Figure 19:
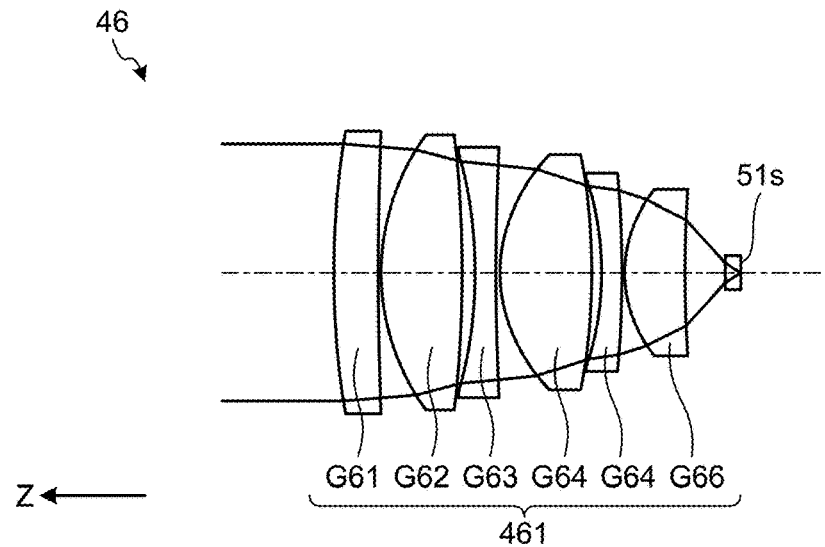
FIG. 19 is a view illustrating a schematic configuration example of the another lens structure according to the second embodiment.

FIGS. 18 and 19 are views illustrating schematic configuration examples of another lens structure in the second embodiment. An exemplified lens structure 46 includes a plurality of lenses 461, a lens frame 462, and a fixing member 463. A focal length is 10 mm, the number of lenses is six, a numerical aperture NA is 0.75, and an objective field of view φ is 0.5 mm.

The plurality of lenses 461 includes a lens G61 to a lens G66. The lens G62 and the lens G63 constitute a cemented division group. The lens G64 and the lens G65 also constitute a cemented division group.

The lens frame 462 includes an opening portion 462a, an opening portion 462b, a protruding portion 462c, a protruding portion 462d, an air hole 462e, an air hole 462f, and an air hole 462g. The air hole 462e is a hole configured to release internal air when the lens G61 is fitted into the lens frame 462. The air hole 462f is a hole configured to release internal air when the lens G63 is fitted into the lens frame 462. The air hole 462g is a hole configured to release internal air when the lens G65 and the lens G66 are fitted into the lens frame 462. The fixing member 463 includes a screw N61, a ring RG6162, and a ring RG6364. The ring RG6162 is disposed so as to provide a space between the lens G61 and the lens G62. The ring RG6364 is disposed so as to provide a space between the lens G63 and the lens G64.

The lens G61 to the lens G65 are positioned by the screw N61, the ring RG6162, the ring RG6364, and the protruding portion 462c of the lens frame 462. The lens G61 to the lens G65, the screw N61, the ring RG6162, and the ring RG6364 are fitted into the lens frame 462 from the opening portion 462a of the lens frame 462 such that an edge of the lens G65 abuts on the protruding portion 462c. The screw N61 presses and fixes an edge of the lens G61, the ring RG6162, edges of the lens G62 and the lens G63, the ring RG6364, and edges of the lens G64 and the lens G65 with respect to the protruding portion 462c in the negative Z-axis direction.

The lens G66 is positioned by the protruding portion 462d of the lens frame 462. The lens G66 is fitted into the lens frame 462 from the opening portion 462b of the lens frame 462 such that an edge of the lens G66 abuts on the protruding portion 462d. Although not illustrated, the lens G66 may be fixed to the lens frame 462 with an adhesive or the like on the outer side of the lens frame 462.

The lens frame 462 is a single frame body, and the lens structure 46 in which the plurality of lenses 461 are positioned inside the lens frame 462 is obtained by the above fitting and fixing.

As traveling in the negative Z-axis direction, light is substantially collected in the plurality of lenses 461 as illustrated in FIG. 19.

The lens structure 46 may also be designed so as to satisfy at least some design conditions of the first design condition to the fourth design condition and the sixth design condition described above.

Figure 20:
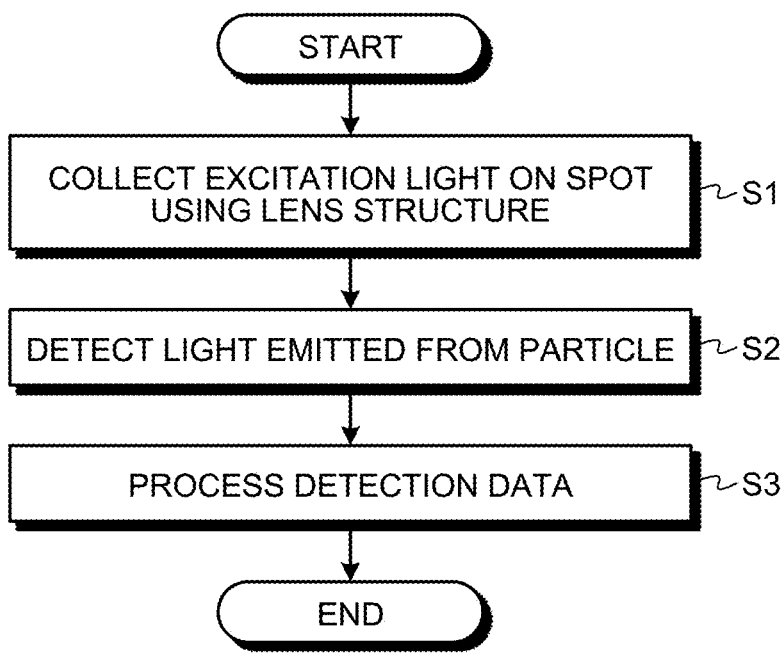
FIG. 20 is a flowchart illustrating an example of processing (a particle analysis method) executed in a particle analyzer.

FIG. 20 is a flowchart illustrating an example of processing (a particle analysis method) executed in the particle analyzer.

In Step S1, the excitation light is collected on the spot using the lens structure. The light source 1 emits the excitation light EL1 and the like, and the objective lens 4 (the lens structure 41 to the lens structure 46) collects the excitation light EL1 and the like on the spot 51s. The particle 51 located at the spot 51s is excited, and light such as the fluorescence FL is emitted.

In Step S2, light emitted from the particle is detected. The detection unit 7 detects the light such as the fluorescence FL emitted from the particle 51 by the irradiation and collection of the excitation light EL1 in Step S1 described above.

In Step S3, detection data is processed. The processing control unit 120 processes the detection data obtained by the detection in Step S2 described above, and analyzes, for example, a component, a size, and the like of the particle 51.

2. Modifications

Although the embodiments of the present disclosure have been described above, the disclosed technology is not limited to the above embodiments. Several modifications will be described.

The open cell sorter has been described as an example of the optical measurement device 110 included in the particle analyzer 100 in the above embodiments. However, the disclosed technology may be applied to a closed cell sorter, an analyzer-type flow cytometer, a microscope that acquires images of particles on a flow path, and the like as described at the beginning.

In the above embodiments, a method using the microchip 5 (microchip method) has been described as an example of a method of supplying the particle 51 to the spot 51s. In addition to the microchip method, however, various methods, for example, a droplet method, a cuvette method, a flow cell method, and the like may be adopted.

In the above embodiments, an example has been described in which the particle 51 is irradiated with the excitation light EL1 (wavelength 349 nm), the excitation light EL2 (wavelength 405 nm), the excitation light EL3 (wavelength 488 nm), the excitation light EL4 (wavelength 561 nm), and the excitation light EL5 (wavelength 637 nm). However, the number of beams and wavelengths of the excitation light are not limited to this example. The particle 51 may be irradiated with (a combination of) various types of excitation light according to a type of the particle 51, an analysis content thereof, and the like.

In the above embodiments, the mirror group 2, the mirror 3, and the imaging lens 6 have been described as examples of the optical system configured to guide the excitation light EL1 and the like to the objective lens 4 and guide the scattered light BSC and the like from the objective lens 4 to the detection unit 7. However, any optical system capable of achieving the same purpose may be adopted without being limited to the mirror group 2, the mirror 3, and the imaging lens 6.

3. Example of Effect

The technology described above is specified as follows, for example. As described with reference to FIGS. 1 and 3 and the like, the particle analyzer 100 includes: the light source 1 that emits the excitation light EL1 and the like including light having a wavelength of 400 nm or less (which may be 350 nm or less) (may also include light having a wavelength longer than 400 nm); the lens structure 41 (objective lens 4) that collects the excitation light EL1 and the like at a predetermined position (spot 51s) in the flow path 53; the detection unit 7 that detects light (the fluorescence FL and the scattered light BSC) emitted from the particle 51 as the particle 51 flowing through the predetermined position is excited by excitation light EL1 and the like; and the processing unit (processing control unit 120) that processes the detection data acquired by the detection unit 7. The lens structure 41 includes the plurality of lenses 411 arranged along the optical axis of the excitation light EL1 and the like (in the negative Z-axis direction), and the lens frame 412 holding the plurality of lenses 411. At least one (the lens G12, the lens G13, the lens G15, and the lens G16) of the plurality of lenses 411 in the lens frame 412 is positioned by abutting on a lens adjacent to the lens.

According to the particle analyzer 100, since the lenses constituting the cemented division group abut on each other and are positioned inside the lens frame 412, the inside of the lens frame 412 can have the adhesive-free structure. Therefore, it is possible to prevent the burning of the adhesive, the burning of the outgas emitted from the adhesive and attached to the lens surface, and the like, which may occur due to passage of the excitation light in the ultraviolet region having a short wavelength such as 400 nm or less through the plurality of lenses 411. Therefore, the deterioration of the optical characteristics can be suppressed.

As described with reference to FIGS. 3 and 5 and the like, when the plurality of lenses 411 includes a positive lens (the lens G18) closest to the subject side (positive Z-axis direction side), and a glass material of the positive lens has a refractive index in the d-line denoted by nd and an Abbe number in the d-line denoted by vd, (1) $1.73<nd<1.83$ and (2) $45<vd$ may be satisfied. As a result, the transmittance in the ultraviolet region can be ensured, and the chromatic aberration can be corrected in the wide band.

As described with reference to FIGS. 3 and 5 and the like, when the plurality of lenses 411 include at least three positive lenses (the lens G12, the lens G14, the lens G15, and the lens G17), and a glass material of the three or more positive lenses has a refractive index in the d-line denoted by nd, an Abbe number in the d-line denoted by vd, and a partial dispersion ratio between the g-line and the F-line denoted by PgF, (3) $nd<1.52$, (4) $79<vd$, and (5) $PgF<0.54$ may be satisfied. This also enables the transmittance in the ultraviolet region to be ensured, and enables the correction of the chromatic aberration in the wide band.

As described with reference to FIGS. 3 and 5 and the like, when the plurality of lenses 411 include at least two or more negative lenses (the lens G11, the lens G13, and the lens G16), and a glass material of the two or more negative lenses has a refractive index in the d-line denoted by nd and an Abbe number in the d-line denoted by vd, (6) nd<1.78 and (7) 29<vd may be satisfied. This also enables the transmittance in the ultraviolet region to be ensured, and enables the correction of the chromatic aberration in the wide band.

As described with reference to FIGS. 3 and 5 and the like, the plurality of lenses 411 may include the front lens group having negative refractive power or substantially no power and the rear lens group 411R having positive refractive power, which are disposed in this order from the incident side to the emission side of the excitation light EL1 and the like (in the negative Z-axis direction). When a focal length of the plurality of lenses 411 is denoted by ft, a focal length of the front lens group 411F is denoted by f1, and a focal length of the rear lens group 411R is denoted by f2, the plurality of lenses 411 may satisfy (8) $-0.24<ft/f1<0.08$ and (9) $0.35<ft/f2<0.7$. As a result, the focal length of the objective lens can be shortened as compared with, for example, the case where the telephoto configuration is provided.

As described with reference to FIG. 3 and the like, the particle analyzer 100 may include the aperture stop 414 provided between the front lens group 411F and the rear lens group 411R. Thus, the amount of passing light can be adjusted between the front lens group 411F and the rear lens group 411R.

As described with reference to FIG. 4 and the like, the lens structure 41 may collect the light (the fluorescence FL and the scattered light BSC) emitted from the particle 51 toward the detection unit 7. As a result, the light to be detected can be efficiently guided to the detection unit 7.

As described with reference to FIG. 15 and the like, the outer shapes of the plurality of lenses 451 may be substantially smaller from the incident side to the emission side of the excitation light EL1 and the like (in the positive Z-axis direction). With such a telephoto configuration, there is a higher possibility that the number of lenses can be reduced and the cost can be reduced as compared with, for example, the case where the retrofocus configuration (inverse telephoto configuration) is provided. In addition, for example, since the plurality of lenses can be fitted and held in the single lens frame, the cost of a mechanical component can be reduced accordingly.

As described with reference to FIG. 1 and the like, the particle analyzer 100 may include the optical system (mirror 3) disposed among the light source 1, the lens structure 41 (objective lens 4), and the detection unit 7. The optical system (mirror 3) may include the central portion 31 that reflects the excitation light EL1 and the like, and the peripheral portion 32 that transmits the light (fluorescence FL and scattered light BSC) emitted from the particle 51. For example, when the optical system (mirror 3) having such a configuration is used, the excitation light EL1 and the like from the light source 1 can be guided to the lens structure 41, and the fluorescence FL and the like from the objective lens 4 can be guided to the detection unit 7.

The particle analysis method described with reference to FIGS. 1, 3, 20, and the like is also a mode of the present disclosure. The particle analysis method includes: collecting the excitation light EL1 and the like including light having a wavelength of 400 nm or less at a predetermined position (spot 51s) in the flow path 53 using the lens structure 41 (objective lens 4) (Step S1); detecting the light (fluorescence FL and scattered light BSC) emitted from the particle 51 as the particle 51 flowing through the predetermined position is excited by the excitation light EL1 and the like (Step S2); and processing the detection data (Step S3). The lens structure 41 includes the plurality of lenses 411 arranged along the optical axis of the excitation light EL1 and the like (in the negative Z-axis direction), and the lens frame 412 holding the plurality of lenses 411. At least one (the lens G12, the lens G13, the lens G15, and the lens G16) of the plurality of lenses 411 in the lens frame 412 is positioned by abutting on a lens adjacent to the lens. With such a particle analysis method as well, the deterioration of the optical characteristics can be suppressed as described above.

The optical measurement device 110 described with reference to FIGS. 1 and 3 is also a mode of the present disclosure. The optical measurement device 110 includes: the light source 1 that emits the excitation light EL1 and the like including light having a wavelength of 400 nm or less; the lens structure 41 (objective lens 4) that collects the excitation light EL1 and the like at a predetermined position (spot 51s) in the flow path 53; and the detection unit 7 that detects the light (fluorescence FL and scattered light BSC) emitted from the particle 51 as the particle 51 flowing through the predetermined position is excited by the excitation light EL1 and the like. The lens structure 41 includes the plurality of lenses 411 arranged along the optical axis of the excitation light EL1 and the like (in the negative Z-axis direction), and the lens frame 412 holding the plurality of lenses 411. At least one (the lens G12, the lens G13, the lens G15, and the lens G16) of the plurality of lenses 411 in the lens frame 412 is positioned by abutting on a lens adjacent to the lens. Such an optical measurement device 110 can also suppress the deterioration of the optical characteristics as described above.

Note that the effects described in the present disclosure are merely examples and are not limited to the disclosed contents. There may be other effects.

Although the above description is given regarding the embodiments of the present disclosure, the technical scope of the present disclosure is not limited to the above-described embodiments as they are, and various modifications can be made without departing from the scope of the present disclosure. In addition, the constituent elements in different embodiments and modifications can be combined suitably.

Note that the disclosed technology may have the following configuration.

<1> A particle analyzer comprising:
   a light source that emits excitation light including light having a wavelength of 400 nm or less;
   a lens structure that collects the excitation light at a predetermined position in a flow path;
   a detection unit that detects light emitted from a particle as the particle flowing through the predetermined position is excited by the excitation light; and
   a processing unit that processes detection data acquired by the detection unit, wherein
   the lens structure comprises:
   a plurality of lenses arranged along an optical axis of the excitation light; and
   a lens frame holding the plurality of lenses, and
   at least one of the plurality of lenses is positioned in the lens frame by abutting on a lens adjacent to the at least one lens.
<2> The particle analyzer according to <1>, wherein
   when the plurality of lenses include a positive lens closest to a subject side, and a glass material of the positive lens has a refractive index in d-line denoted by nd and an Abbe number in the d-line denoted by vd, $$1.73 < nd < 1.83, \text{ and} \quad (1)$$

$$45 < vd \quad (2)$$

are satisfied.

<3> The particle analyzer according to <1> or <2>, wherein when the plurality of lenses include at least three positive lenses, and a glass material of the three or more positive lenses has a refractive index in d-line denoted by nd, an Abbe number in the d-line denoted by vd, and a partial dispersion ratio PgF between g-line and F-line, $$nd < 1.52, \quad (3)$$

$$79 < vd, \text{ and} \quad (4)$$

$$PgF < 0.54 \quad (5)$$

are satisfied.

<4> The particle analyzer according to any one of <1> to <3>, wherein when the plurality of lenses include at least two negative lenses, and a glass material of the two or more negative lenses has a refractive index in d-line denoted by nd and an Abbe number in the d-line denoted by vd, $$nd < 1.78, \text{ and} \quad (6)$$

$$29 < vd \quad (7)$$

are satisfied.

<5> The particle analyzer according to any one of <1> to <4>, wherein the plurality of lenses include a front lens group having negative refractive power or substantially no power and a rear lens group having positive refractive power, the front lens group and the rear lens group being disposed in order from an incident side to an emission side of the excitation light.

<6> The particle analyzer according to <5>, wherein when a focal length of the plurality of lenses is denoted by ft, a focal length of the front lens group is denoted by f1, and a focal length of the rear lens group is denoted by f2, the plurality of lenses satisfy $$-0.24 < ft/f1 < 0.08, \text{ and} \quad (8)$$

$$0.35 < ft/f2 < 0.7. \quad (9)$$

<7> The particle analyzer according to <5> or <6>, further comprising an aperture stop provided between the front lens group and the rear lens group.

<8> The particle analyzer according to any one of <1> to <7>, wherein the lens structure collects the light emitted from the particle toward the detection unit.

<9> The particle analyzer according to any one of <1> to <4>, wherein outer shapes of the plurality of lenses become substantially smaller from an incident side to an emission side of the excitation light.

<10> The particle analyzer according to any one of <1> to <9>, further comprising an optical system disposed among the light source, the lens structure, and the detection unit.

<11> The particle analyzer according to <10>, wherein the optical system has a central portion that reflects the excitation light, and a peripheral portion that transmits the light emitted from the particle.

<12> The particle analyzer according to any one of <1> to <11>, wherein the light source emits excitation light including light having a wavelength of 350 nm or less.

<13> The particle analyzer according to any one of <1> to <12>, wherein the light source also emits excitation light including light having a wavelength longer than 400 nm.

<14> A particle analysis method comprising:
collecting excitation light including light having a wavelength of 400 nm or less at a predetermined position in a flow path using a lens structure;
detecting light emitted from a particle as the particle flowing through the predetermined position is excited by the excitation light; and
processing detection data, wherein
the lens structure includes:
a plurality of lenses arranged along an optical axis of the excitation light; and
a lens frame holding the plurality of lenses, and
at least one of the plurality of lenses is positioned in the lens frame by abutting on a lens adjacent to the at least one lens.

<15> An optical measurement device comprising:
a light source that emits excitation light including light having a wavelength of 400 nm or less;
a lens structure that collects the excitation light at a predetermined position in a flow path; and
a detection unit that detects light emitted from a particle as the particle flowing through the predetermined position is excited by the excitation light, wherein
the lens structure comprises:
a plurality of lenses arranged along an optical axis of the excitation light; and
a lens frame holding the plurality of lenses, and
at least one of the plurality of lenses is positioned in the lens frame by abutting on a lens adjacent to the at least one lens.

REFERENCE SIGNS LIST

100 PARTICLE ANALYZER
110 OPTICAL MEASUREMENT DEVICE
120 PROCESSING CONTROL UNIT
1 LIGHT SOURCE
11 LIGHT SOURCE
12 LIGHT SOURCE
13 LIGHT SOURCE
14 LIGHT SOURCE
15 LIGHT SOURCE
2 MIRROR GROUP
21 MIRROR
22 MIRROR
23 MIRROR
24 MIRROR
25 MIRROR
3 MIRROR
31 CENTRAL PORTION
32 PERIPHERAL PORTION
4 OBJECTIVE LENS
5 MICROCHIP
51 PARTICLE

51s SPOT
52 BIOLOGICAL SAMPLE
53 FLOW PATH
6 IMAGING LENS
7 DETECTION UNIT
8 DETECTION UNIT
41 LENS STRUCTURE
411 PLURALITY OF LENSES
411F FRONT LENS GROUP
411R REAR LENS GROUP
G11 LENS
G12 LENS
G13 LENS
G14 LENS
G15 LENS
G16 LENS
G17 LENS
G18 LENS
412 LENS FRAME
412F FRONT FRAME BODY
412Fa OPENING PORTION
412Fb OPENING PORTION
412Fc PROTRUDING PORTION
412Fd PROTRUDING PORTION
412R REAR FRAME BODY
412Ra OPENING PORTION
412Rb OPENING PORTION
412Rc PROTRUDING PORTION
412Rd PROTRUDING PORTION
413 FIXING MEMBER
N11 SCREW
N13 SCREW
N14 SCREW
RG1415 RING
RG1617 RING
AD18 ADHESIVE
414 APERTURE STOP

The invention claimed is:

1. A particle analyzer comprising:
a light source that emits excitation light including light having a wavelength of 400 nm or less;
a lens structure that collects the excitation light at a predetermined position in a flow path;
a detection unit that detects light emitted from a particle as the particle flowing through the predetermined position is excited by the excitation light; and
a processing unit that processes detection data acquired by the detection unit, wherein
the lens structure comprises:
a plurality of lenses arranged along an optical axis of the excitation light; and
a lens frame holding the plurality of lenses, and
at least one of the plurality of lenses is positioned in the lens frame by abutting on a lens adjacent to the at least one lens.

2. The particle analyzer according to claim 1, wherein when the plurality of lenses include a positive lens closest to a subject side, and a glass material of the positive lens has a refractive index in d-line denoted by nd and an Abbe number in the d-line denoted by vd, $$1.73 < nd < 1.83, \text{ and} \quad (1)$$

$$45 < vd \quad (2)$$

are satisfied.

3. The particle analyzer according to claim 1, wherein when the plurality of lenses include at least three positive lenses, and a glass material of the three or more positive lenses has a refractive index in d-line denoted by nd, an Abbe number in the d-line denoted by vd, and a partial dispersion ratio PgF between g-line and F-line, $$nd < 1.52, \quad (3)$$

$$79 < vd, \text{ and} \quad (4)$$

$$PgF < 0.54 \quad (5)$$

are satisfied.

4. The particle analyzer according to claim 1, wherein when the plurality of lenses include at least two negative lenses, and a glass material of the two or more negative lenses has a refractive index in d-line denoted by nd and an Abbe number in the d-line denoted by vd, $$nd < 1.78, \text{ and} \quad (6)$$

$$29 < vd \quad (7)$$

are satisfied.

5. The particle analyzer according to claim 1, wherein the plurality of lenses include a front lens group having negative refractive power or substantially no power and a rear lens group having positive refractive power, the front lens group and the rear lens group being disposed in order from an incident side to an emission side of the excitation light.

6. The particle analyzer according to claim 5, wherein when a focal length of the plurality of lenses is denoted by ft, a focal length of the front lens group is denoted by f1, and a focal length of the rear lens group is denoted by f2, the plurality of lenses satisfy $$-0.24 < ft/f1 < 0.08, \text{ and} \quad (8)$$

$$0.35 < ft/f2 < 0.7 \quad (9).$$

7. The particle analyzer according to claim 5, further comprising
an aperture stop provided between the front lens group and the rear lens group.

8. The particle analyzer according to claim 1, wherein the lens structure collects the light emitted from the particle toward the detection unit.

9. The particle analyzer according to claim 1, wherein outer shapes of the plurality of lenses become substantially smaller from an incident side to an emission side of the excitation light.

10. The particle analyzer according to claim 1, further comprising
an optical system disposed among the light source, the lens structure, and the detection unit.

11. The particle analyzer according to claim 10, wherein the optical system has
a central portion that reflects the excitation light, and
a peripheral portion that transmits the light emitted from the particle.

12. The particle analyzer according to claim 1, wherein the light source emits excitation light including light having a wavelength of 350 nm or less.

13. The particle analyzer according to claim 1, wherein the light source also emits excitation light including light having a wavelength longer than 400 nm.

14. A particle analysis method comprising:
collecting excitation light including light having a wavelength of 400 nm or less at a predetermined position in a flow path using a lens structure;

detecting light emitted from a particle as the particle flowing through the predetermined position is excited by the excitation light; and processing detection data, wherein the lens structure includes:

a plurality of lenses arranged along an optical axis of the excitation light; and a lens frame holding the plurality of lenses, and at least one of the plurality of lenses is positioned in the lens frame by abutting on a lens adjacent to the at least one lens.

15. An optical measurement device comprising:

a light source that emits excitation light including light having a wavelength of 400 nm or less;

a lens structure that collects the excitation light at a predetermined position in a flow path; and a detection unit that detects light emitted from a particle as the particle flowing through the predetermined position is excited by the excitation light, wherein the lens structure comprises:

a plurality of lenses arranged along an optical axis of the excitation light; and a lens frame holding the plurality of lenses, and at least one of the plurality of lenses is positioned in the lens frame by abutting on a lens adjacent to the at least one lens.

* * * * *